US009061578B2

(12) United States Patent
Haneda et al.

(10) Patent No.: US 9,061,578 B2
(45) Date of Patent: Jun. 23, 2015

(54) HYBRID DRIVING APPARATUS

(71) Applicants: Aisin Seiki Kabushiki Kaisha, Kariya-shi (JP); Aisin Aw Co., Ltd., Anjo-shi (JP)

(72) Inventors: Yoshitomi Haneda, Anjo (JP); Hiroshi Imai, Nissin (JP); Tokiyoshi Kida, Nagoya (JP); Tomoo Atarashi, Kariya (JP); Shigeki Takami, Anjo (JP); Masaki Nomura, Anjo (JP); Takafumi Koshida, Anjo (JP)

(73) Assignees: AISIN SEIKI KABUSHIKI KAISHA, Kariya-shi (JP); AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 14/105,449

(22) Filed: Dec. 13, 2013

(65) Prior Publication Data
US 2014/0171261 A1 Jun. 19, 2014

(30) Foreign Application Priority Data

Dec. 14, 2012 (JP) ................................. 2012-273146

(51) Int. Cl.
- B60W 10/02 (2006.01)
- B60K 6/42 (2007.10)
- B60K 6/445 (2007.10)
- B60W 20/00 (2006.01)

(52) U.S. Cl.
CPC ................. B60K 6/42 (2013.01); *Y10T 477/26* (2015.01); *B60W 20/108* (2013.01); B60K 6/445 (2013.01); B60W 10/02 (2013.01); *B60W 2550/12* (2013.01); *B60W 2550/402* (2013.01); *Y10S 903/912* (2013.01); *Y02T 10/6239* (2013.01)

(58) Field of Classification Search
CPC .................................. B60K 41/02; B60K 6/42
USPC .......................................................... 477/166
See application file for complete search history.

(56) References Cited

U.S. PATENT DOCUMENTS 5,570,937 A * 11/1996 Wolfsried ..................... 303/191
2005/0032598 A1* 2/2005 Hanyu et al. ...................... 475/5

FOREIGN PATENT DOCUMENTS

| JP | 58-42835 | 3/1983 |
|----|----------|--------|
| JP | 58-42836 | 3/1983 |
| JP | 2005-351357 | 12/2005 |
| JP | 2007-118862 | 5/2007 |
| JP | 2010-076678 | 4/2010 |
| JP | 2010-167837 | 8/2010 |

OTHER PUBLICATIONS

Office Action issued Mar. 24, 2015 in Japanese Patent Application No. 2012-273146 (with English translation).

* cited by examiner

*Primary Examiner* — Derek D Knight
(74) *Attorney, Agent, or Firm* — Oblon, McClelland, Maier & Neustadt, L.L.P.

(57) ABSTRACT

A hybrid driving apparatus includes an engine configured to output a rotation driving force to an output shaft; an input shaft configured to rotate in association with rotation of driving wheels of a vehicle; a clutch that is provided between the output shaft and the input shaft to disengageably connect the output shaft and the input shaft; a clutch actuator configured to operate the clutch; a motor generator configured to rotate in association with rotation of the input shaft; a rust formation determining unit configured to determine whether there is a possibility of a rust formation on the clutch; and a rust formation suppressing unit configured to operate the clutch actuator in a case where the rust formation determining unit determines that there is the possibility of the rust formation on the clutch.

14 Claims, 13 Drawing Sheets

HYBRID DRIVING APPARATUS

CROSS-REFERENCE TO RELATED APPLICATION

This application claims priority from Japanese Patent Application No. 2012-273146 filed on Dec. 14, 2012, the entire subject matter of which is incorporated herein by reference.

TECHNICAL FIELD

This disclosure relates to a hybrid driving apparatus which has a clutch that disengageably connects an output shaft of an engine and an input shaft that rotates in association with driving wheels, and a motor generator that rotates in association with rotation of the input shaft.

BACKGROUND

Japanese Patent Application Laid-Open No. 2010-76678 discloses a hybrid vehicle having an engine, a clutch that disengageably engages an output shaft of the engine and an input shaft of a gear mechanism, and a motor generator that rotates in association with rotation of the input shaft. In a hybrid vehicle disclosed in Japanese Patent Application Laid-Open No. 2010-76678, during an electric traveling mode in which the hybrid vehicle travels by a driving force of a motor generator, a clutch is disconnected, so that an engine and a driving wheel are disconnected, so that a friction loss according to rotation of the engine is reduced to improve in fuel efficiency. Meanwhile, during split traveling in which the hybrid travels by the driving forces of the engine and the motor generator, the clutch is connected.

In this hybrid vehicle, in order to suppress a loss according to a drag of a clutch during clutch disconnection, it is general to use a dry-type clutch. In this dry-type clutch, in order to suppress overheating of a clutch plate, traveling air is introduced into the clutch, so that the clutch plate is cooled.

SUMMARY

As described above, since traveling air is introduced into the dry-type clutch, in a case where road surface is wet, according to introduction of traveling air, water is also introduced into the dry-type clutch. Also, in the hybrid vehicle, in a case of a split traveling mode, since the clutch is maintained at a connected state, the frequency of clutch disconnection is low. Therefore, if the connected state of the clutch continues, the clutch may be rusted and be firmly fixed, so that the clutch becomes unable to be disconnected.

This disclosure was made in view of these circumstances, and this disclosure provides a technology, capable of suppressing rusting of a clutch in a hybrid driving apparatus including the clutch that disengageably connects an output shaft of an engine and an input shaft which rotates in association with driving wheels, and a motor generator that rotates in association with rotation of the input shaft.

In view of the above, a hybrid driving apparatus of this disclosure includes: an engine configured to output a rotation driving force to an output shaft; an input shaft configured to rotate in association with rotation of driving wheels of a vehicle; a clutch that is provided between the output shaft and the input shaft to disengageably connect the output shaft and the input shaft; a clutch actuator configured to operate the clutch; a motor generator configured to rotate in association with rotation of the input shaft; a rust formation determining unit configured to determine whether there is a possibility of a rust formation on the clutch; and a rust formation suppressing unit configured to operate the clutch actuator in a case where the rust formation determining unit determines that there is the possibility of the rust formation on the clutch.

BRIEF DESCRIPTION OF THE DRAWINGS

The foregoing and additional features and characteristics of this disclosure will become more apparent from the following detailed descriptions considered with the reference to the accompanying drawings, wherein.

BRIEF DESCRIPTION (Configuration of Hybrid Driving Apparatus)

Figure 1:
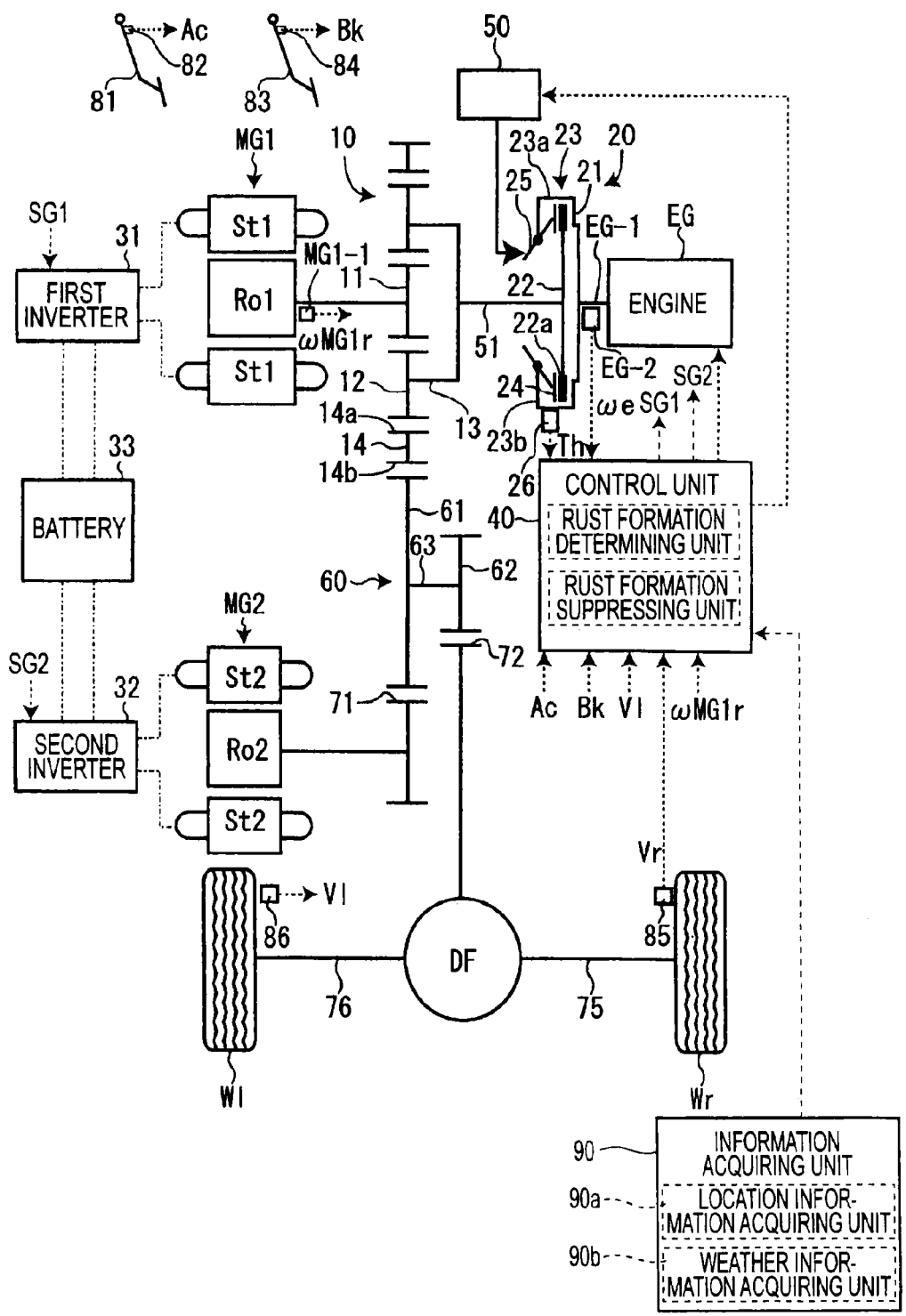
FIG. 1 is an explanatory view illustrating the configuration of a hybrid driving apparatus of a first embodiment.

Hereinafter, a hybrid driving apparatus 100 of an embodiment (first embodiment) of this disclosure will be described with reference to the accompanying drawings. In FIG. 1, broken lines represent transmission paths of a variety of information, and alternate long and short dash lines represent transmission paths of electric power. A hybrid vehicle (hereinafter, referred to simply as a vehicle) has the hybrid driving apparatus 100. The hybrid driving apparatus 100 of the present embodiment includes an engine EG, a first motor generator MG1, a second motor generator MG2, a planetary gear mechanism 10, a clutch 20, a first inverter 31, a second inverter 32, a battery 33, a clutch actuator 50, a control unit 40, and an information acquiring unit 90.

In the following description, the state of the clutch 20 until the clutch 20 being in a disconnected state becomes a connected state, that is, the state of the clutch 20 in which there is a clutch differential rotation speed $\Delta\omega r$ is referred to as a half-clutch state or the engagement state of the clutch 20.

The engine EG is a gasoline engine, diesel engine, or the like which uses hydrocarbon-based fuel such as gasoline or light oil, and gives a rotation driving force to driving wheels Wl and Wr. The engine EG outputs the rotation driving force to an output shaft EG-1.

In the vicinity of the output shaft EG-1, an engine rotation speed sensor EG-2 is installed. The engine rotation speed sensor EG-2 detects an engine rotation speed we which is the rotation speed of the output shaft EG-1, and outputs the detection signal of the engine rotation speed to the control unit 40. Also, the engine EG includes a fuel injection device (not shown) for injecting fuel into an air intake port and each cylinder. In a case where the engine EG is a gasoline engine, in each cylinder, a spark plug (not shown) is provided.

The clutch 20, which is an arbitrary type of clutch, is provided between the output shaft EG-1 and an input shaft 51 of the planetary gear mechanism 10 and disengageably connects the output shaft EG-1 and the input shaft 51, thereby electronically controlling a clutch torque Tcr which is a transmission torque between the output shaft EG-1 and the input shaft 51. In the present embodiment, the clutch 20 is a dry-type normally-closed single-plate clutch, and includes a flywheel 21, a clutch disc 22, a clutch cover 23, a pressure plate 24, and a diaphragm spring 25.

The clutch 20 is a normally-closed clutch to be in the connected state in a case where an ignition is OFF-state. The reason is that it is possible to travel by the driving force of the engine EG even if the clutch actuator 50 breaks down.

The flywheel 21 is a circular plate having predetermined mass, and is connected to the output shaft EG-1 and rotates integrally with the output shaft EG-1. The clutch disc 22 is a circular plate having a friction member 22a provided at an outer peripheral portion thereof and faces the flywheel 21 so as to be able to come into contact with and separate from the flywheel 21. The friction member 22a is a so-called clutch lining and is configured by an aggregate such as a metal, a binder such as a synthetic resin for combining the aggregate, and the like. The clutch disc 22 is connected to the input shaft 51, and rotates integrally with the input shaft 51.

The clutch cover 23 includes a cylindrical portion 23a provided on the outer periphery side of the clutch disc 22 so as to be connected to the outer edge of the flywheel 21, and an annular-disc-shaped side peripheral wall 23 that extends from an end portion of the cylindrical portion 23a, which is placed on the opposite side to the connection portion with the flywheel 21, toward the inner side in a radial direction. The pressure plate 24 has an annular disc shape, and is provided to face the opposite side of the clutch disc 22 to the surface of the clutch disc 22 facing the flywheel 21 so that the pressure plate 24 can come into contact with and separate from the clutch disc 22.

The diaphragm spring 25 is a kind of so-called disc spring, and includes a diaphragm formed to be inclined in the thickness direction of the diaphragm spring 25. An intermediate portion of the diaphragm spring 25 in the radial direction abuts on the inner edge of the side peripheral wall 23b of the clutch cover 23, and the outer edge of the diaphragm spring 25 abuts on the pressure plate 24.

The diaphragm spring 25 presses the clutch disc 22 against the flywheel 21 with the pressure plate 24 interposed between the diaphragm spring 25 and the pressure plate 24. In this state, the friction member 22a of the clutch disc 22 is pressed by the flywheel 21 and the pressure plate 24, and due to the frictional force of the friction member 22a with the flywheel 21 and the pressure plate 24, the clutch disc 22 and the flywheel 21 integrally rotate, and the output shaft EG-1 and the input shaft 51 are connected.

Inside a housing (not shown) for storing the clutch 20, a temperature sensor 26 is installed. A housing inside temperature Th detected by the temperature sensor 26 is input to the control unit 40.

The clutch actuator 50 operates the clutch 20. That is, based on commands of the control unit 40, the clutch actuator 50 presses the inner edge portion of the diaphragm spring 25 against the flywheel (21) side, or releases the pressing, thereby varying the clutch torque Tcr of the clutch 20.

The clutch actuator 50 includes an electric motor, a worm gear, and a worm member. The worm gear is installed on the rotating shaft of the electric motor and is engaged with the worm member. By the worm gear and the worm member, rotational movement of the electric motor is converted into linear movement.

If the clutch actuator 50 presses the inner edge portion of the diaphragm spring 25 toward the flywheel (21) side, the diaphragm spring 25 is deformed so that the outer edge of the diaphragm spring 25 is deformed in a direction away from the flywheel 21. Then, due to the deformation of the diaphragm spring 25, the pressing force of the flywheel 21 and the pressure plate 24 pressing the clutch disc 22 decreases gradually, and the clutch torque Tcr, which is the transmission torque between the clutch disc 22, and the flywheel 21 and the pressure plate 24, also decreases gradually, so that the output shaft EG-1 and the input shaft 51 are disconnected.

As described above, the control unit 40 drives the clutch actuator 50, thereby arbitrarily varying the clutch torque Tcr between the clutch disc 22, and the flywheel 21 and the pressure plate 24. Also, since the clutch actuator 50 has the worm gear and the worm member, even if supply of electric power to the electric motor stops, the current state of the clutch 20 is maintained. That is, in a case where the clutch 20 is in the disconnected state, the disconnected state is maintained. In a case where the clutch 20 is in the connected state, the connected state is maintained.

The first motor generator MG1 operates as a motor for applying a rotation driving force to the driving wheels Wl and Wr, and also operates as an electricity generator for converting the kinetic energy of the vehicle into electric power. The first motor generator MG1 includes a first stator St1 fixed to a case (not shown), and a first rotor Ro1 rotatably installed on the inner periphery side of the first stator St1. Also, in the vicinity of the first rotor Ro1, a rotation speed sensor MG1-1 for detecting the rotation speed ωMG1r of the first motor generator MG1 (the first rotor Ro1) and outputting the detected detection signal to the control unit 40 is installed.

The first inverter 31 is electrically connected to the first stator St1 and the battery 33. Also, the first inverter 31 is connected to the control unit 50 so that communication is possible. On a control signal from the control unit 40, the first inverter 31 converts a DC current, which is supplied from the battery 33, into an AC current with boosting, and then supplies the AC current to the first stator St1, thereby a rotation driving force is generated in the first motor generator MG1 so that the first motor generator MG1 functions as a motor. Also, based on a control signal from the control unit 40, the first inverter 31 makes the first motor generator MG1 function as an electricity generator, thereby converting the AC current, which is generated by the first motor generator MG1, into a DC current while lowering a voltage, so that the battery 33 is charged.

The second motor generator MG2 operates as a motor for applying a rotation driving force to the driving wheels Wl and Wr and also operates as an electricity generator for converting the kinetic energy of the vehicle into electric power. The second motor generator MG2 includes a second stator St2 fixed to a case (not shown), and a second rotor Ro2 rotatably installed on the inner periphery side of the second stator St2.

The second inverter 32 is electrically connected to the second stator St2 and the battery 33. Also, the second inverter 32 is communicatably connected to the control unit 40. Based on a control signal from the control unit 40, the second inverter 32 converts a DC current, which is supplied from the battery 33, into an AC current with boosting, and then supplies the AC current to the second stator St2. Thereby, a rotation driving force is generated in the second motor generator MG2 so that the second motor generator MG2 functions as a motor. Also, based on a control signal from the control unit 40, the second inverter 32 makes the second motor generator MG2 function as an electricity generator, thereby converting the AC current, which is generated by the second motor generator MG2, into a DC current while lowering a voltage, so that the battery 33 is charged.

The planetary gear mechanism 10 distributes the rotation driving force of the engine EG to the first motor generator MG1 and a differential mechanism DF (to be described below), and includes a sun gear 11, a plurality of planetary gears 12, a carrier 13, and a ring gear 14. The sun gear 11 is connected to the first rotor Ro1, and rotates integrally with the first rotor Ro1.

The plurality of planetary gears 12 is disposed around the sun gear 11, and is engaged with the sun gear 11. The carrier 13 pivotally supports the plurality of planetary gears 12 so that the planetary gears 12 are rotatable, and is connected to the input shaft 51, and rotates integrally with the input shaft 51. The ring gear 14 has a ring shape and has an inner gear 14a formed on the inner periphery side thereof, and an output gear 14b is formed on the outer periphery side thereof. The inner gear 14a is engaged with the plurality of planetary gears 12.

A reduction gear 60 includes a first gear 61, a second gear 62, and a connection shaft 63. The first gear 61 is engaged with the output gear 14b of the ring gear 14 while being engaged with an output gear 71 which rotates integrally with the second rotor Ro2. The second gear 62 is connected to the first gear 61 by the connection shaft 63, and rotates integrally with the first gear 61. Also, the diameter and number of teeth of the second gear 62 are set to be smaller than those of the first gear 61. The second gear 62 is engaged with an input gear 72.

The differential mechanism DF distributes the rotation driving force transmitted to the input gear 72, to drive shafts 75 and 76 connected to the driving wheels Wr and Wl, respectively. According to the above-described configuration, the input shaft 51 is rotatably connected to the driving wheels Wl and Wr through the planetary gear mechanism 10, the reduction gear 60, the differential mechanism DF, and the drive shafts 75 and 76. According to this configuration, the input shaft 51 rotates in association with rotation of the driving wheels Wl and Wr.

Also, between the engine EG and the clutch 20, another second clutch different from the clutch 20 does not exist. Further, between the clutch 20 and the driving wheels Wl and Wr, another second clutch different from the clutch 20 does not exist.

The information acquiring unit 90 is connected to the control unit 40 so that communication is possible. The information acquiring unit 90 acquires rust information relating to the rust formation on the clutch 20. The rust information includes location information such as GPS information for specifying the current location of the vehicle, and weather information of the current location of the vehicle. The information acquiring unit 90 includes a location information acquiring unit 90a for acquiring the location information such as GPS information from a GPS satellite, and a weather information acquiring unit 90b for acquiring the weather information by wireless communications such as portable telephone communications. In the present embodiment, the information acquiring unit 90 is a car navigation system.

The control unit 40 generally controls the hybrid driving apparatus 100 and has an ECU. The ECU has an input/output interface, a CPU, a RAM, and a storage unit such as a non-volatile memory which are connected to one another by a bus. The CPU performs a program corresponding to flow charts shown in FIGS. 3 to 7, and 9.

Figure 8:
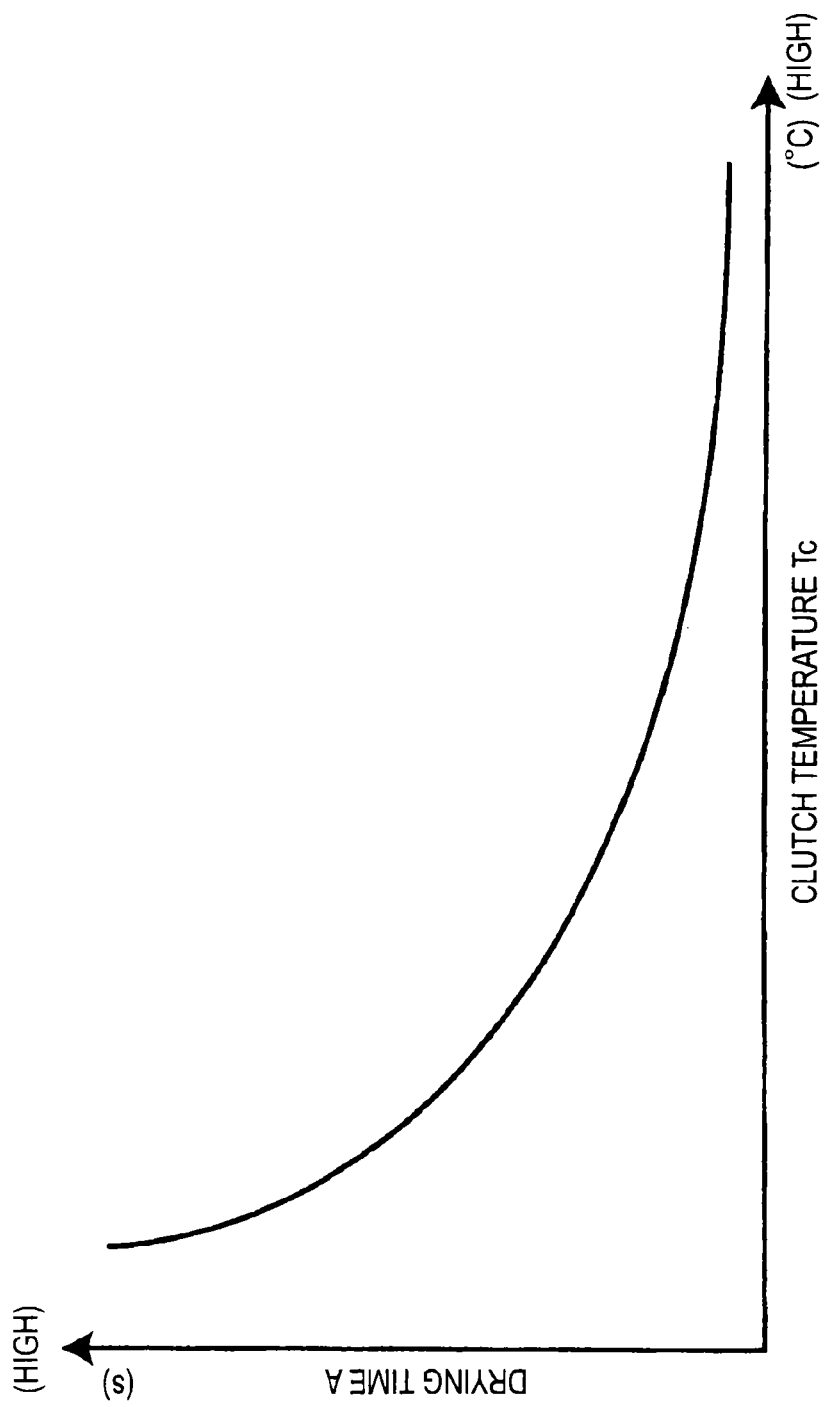
FIG. 8 shows drying-time mapping data representing a relation between temperature of the clutch and drying time.
Figure 10:
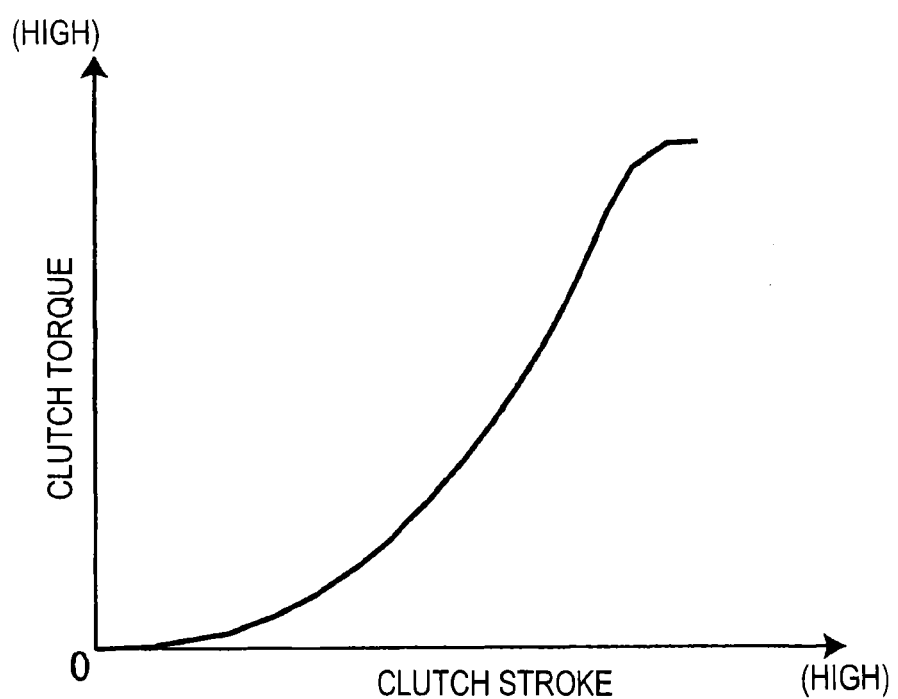
FIG. 10 shows a clutch torque map representing a relation between clutch stroke and clutch torque.

The RAM temporarily stores variables necessary for performing the above-described program, and a storage unit stores detected values from a variety of sensors and stores the above-described program and mapping data shown in FIGS. 8 and 10. Also, the control unit 40 may be configured by a single ECU, or may be configured by a plurality of ECUs.

The control unit 40 acquires information of an accelerator position Ac meaning a relative value of the operation amount of an accelerator pedal 81, from an accelerator sensor 82. Also, the control unit 40 acquires wheel speeds Vl and Vr from wheel speed sensors 85 and 86 for detecting the rotation speeds of the wheels Wl and Wr (which are not limited to driving wheels), and calculates the vehicle speed V of the vehicle based on the corresponding wheel speeds Vr and Vl. Thereafter, the control unit 40 calculates a required driving force based on the accelerator position Ac and the vehicle speed V.

Further, the control unit 40 acquires information of a brake position Bk meaning a relative value of the operation amount of a brake pedal 83, from a brake sensor 84 for detecting the operation amount. Thereafter, the control unit 40 calculates a required braking force based on the brake position Bk.

The control unit 40 calculates an input shaft rotation speed $\omega i$, which is the rotation speed of the input shaft 51 (the carrier 13), based on the rotation speed $\omega MG1r$ of the first motor generator MG1 input from the rotation speed sensor MG1-1, the rotation speed $\omega MG2r$ of the second motor generator MG2 (calculated from the vehicle speed V), and the gear ratio between the sun gear 11 and the inner gear 14a.

In FIG. 10, a solid line represents a clutch torque map representing a relation between the clutch torque Tcr and a clutch stroke. As shown in FIG. 10, in a standby position in which the clutch stroke is 0, the clutch 20 of the present embodiment is completely disconnected, and the clutch torque Tcr is 0. Thereafter, as the clutch stroke increases, the clutch torque Tcr increases, and when the clutch stroke is the maximum, the clutch 20 is completely engaged.

The control unit 40 calculates the clutch stroke by referring to the clutch torque map shown in FIG. 10 for a target clutch torque Tct. Thereafter, the control unit 40 controls the clutch actuator 50 so that the calculated clutch stroke is obtained and controls the clutch 20 so that the clutch torque Tcr becomes the target clutch torque Tct.

(Descriptions of Electric Traveling Mode and Split Traveling Mode)

Subsequently, an electric traveling mode and a split traveling mode will be described with reference to the velocity diagram of FIG. 2. The vehicle travels in the electric traveling mode or the split traveling mode, and both traveling modes can be switched during traveling. The electric traveling mode is a mode in which the vehicle travels by the rotation driving force of only at least one of the first motor generator MG1 and the second motor generator MG2. The split traveling mode is a mode in which the vehicle travels by the rotation driving force of both at least one of the first motor generator MG1 and the second motor generator MG2 and the rotation driving force of the engine EG.

Figure 2:
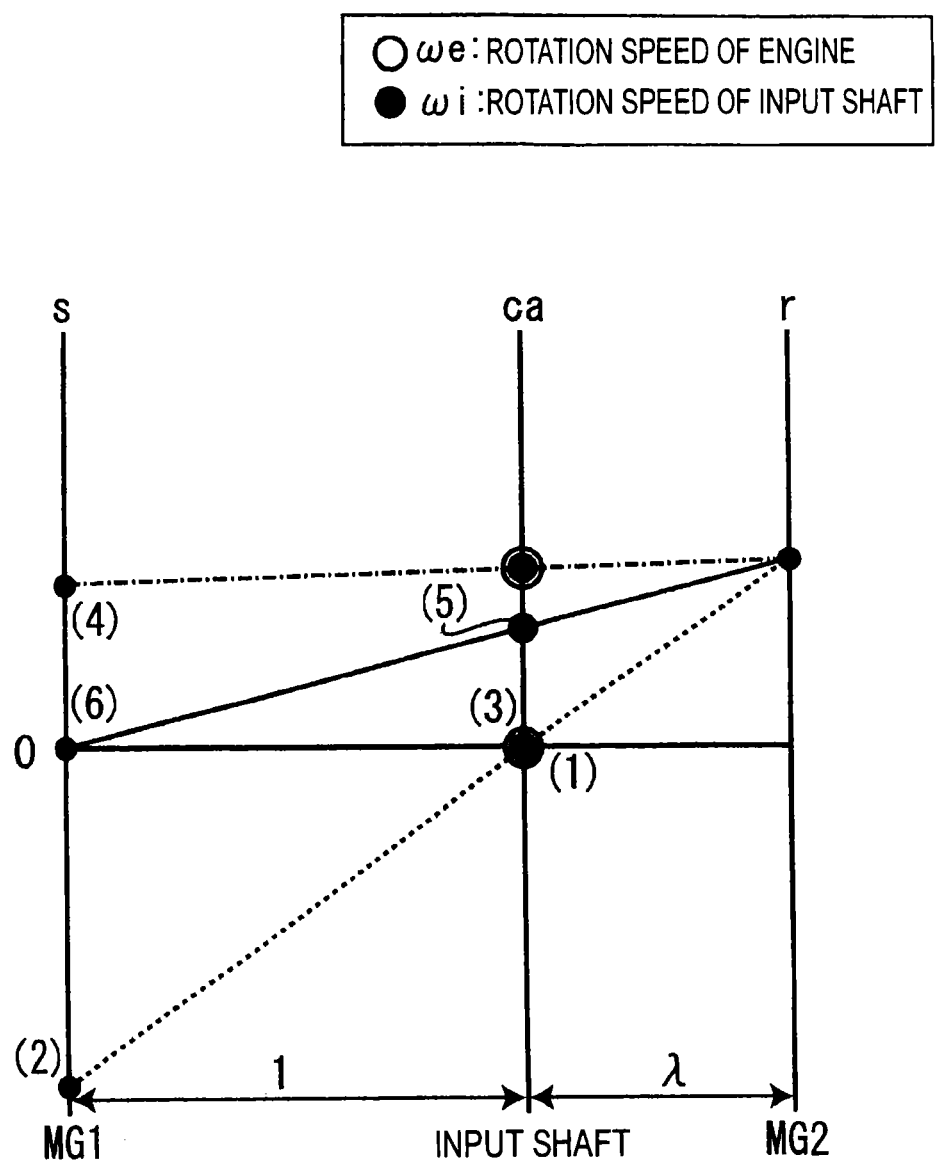
FIG. 2 is a velocity diagram of a planetary gear mechanism in an electric traveling mode and a split traveling mode.

In the velocity diagram of FIG. 2, the vertical axes correspond to the rotation speeds of respective rotary components. In FIG. 2, an area upper than 0 corresponds to normal rotation, and an area lower than 0 corresponds to reverse rotation. In FIG. 2, a reference symbol "s" represents the rotation speed of the sun gear 11, and a reference symbol "ca" represents the rotation speed of the carrier 13, and a reference symbol "r" represents the rotation speed of the ring gear 14. That is, the reference symbol "s" represents the rotation speed of the first motor generator MG1, and the reference symbol "ca" represents the rotation speed of the input shaft 51, and the reference symbol "r" represents the rotation speed of the second motor generator MG2 or a rotation speed proportional to the driving wheels Wl and Wr (the vehicle speed). Also, if the clutch 20 is completely connected, the rotation speed ca becomes the same rotation speed as the rotation speed of the output shaft EG-1 of the engine EG. Further, if it is assumed that the interval between the vertical lines representing the rotation speeds "s" and "ca" is 1, the interval between the vertical lines representing the rotation speeds "ca" and "r" becomes the gear ratio λ of the planetary gear mechanism 10 (the gear ratio of the sun gear 11 and the inner gear 14a (That is, [NUMBER OF TEETH OF SUN GEAR 11]/[NUMBER OF TEETH OF INNER GEAR 14a]). Like this, the first motor generator MG1 (the first rotor Ro1), the input shaft 51, and the second motor generator MG2 rotate in association with one another.

In a case where the residual amount of the battery 33 is sufficient, if the required driving force is obtained only by the rotation driving forces of the first motor generator MG1 and the second motor generator MG2, the vehicle travels in the electric traveling mode.

In the electric traveling mode, in a case where the vehicle travels only by the rotation driving force of the second motor generator MG2, the control unit 40 controls the clutch actuator 50 so that the clutch 20 becomes the disconnected state. As a result, the engine EG and the input shaft 51 are disconnected. Thereafter, the control unit 40 outputs a control signal to the second inverter 32, thereby driving the second motor generator MG2 so that the required driving force is obtained. In this state, as shown by a solid line in FIG. 2, the second motor generator MG2 normally rotates. Then, since the engine EG has been disconnected from the input shaft 51, the engine EG is at a stop (the engine rotation speed ωe is 0) (the state of (1) of FIG. 2). In this case where the vehicle travels only by the rotation driving force of the second motor generator MG2, since the clutch 20 is in the disconnected state, the input shaft 51 is in a state capable of freely rotating ((5) of FIG. 2). For this reason, due to free rotation of the input shaft 51, the rotation driving force of the second motor generator MG2 transmitted to the ring gear 14 runs idle inside the planetary gear mechanism 10 and is not transmitted to the first motor generator MG1, and thus the first motor generator MG1 does not rotate (the rotation speed ωMG1r is 0) ((6) of FIG. 2). Like this, since the first motor generator MG1 does not rotate, occurrence of a loss (the inertia torque of the first rotor Ro1) according to rotation of the first motor generator MG1 is suppressed, and the electricity efficiency of the vehicle is improved.

In a case where the required driving force is not obtained only by the rotation driving force of the second motor generator MG2 during traveling of the vehicle in the electric traveling mode, the control unit 40 outputs a control signal to the clutch actuator 50 so that the clutch actuator 50 connects the clutch 20, so that the output shaft EG-1 and the input shaft 51 are engaged, and then outputs control signals to the first inverter 31 and the second inverter 32, so that the first inverter 31 and the second inverter 32 drive the first motor generator MG1 and the second motor generator MG2, so that the required driving force is obtained. In this state, as shown by a broken line in FIG. 2, the first motor generator MG1 reversely rotates (the state of (2) of FIG. 2), and the second motor generator MG2 normally rotates, and the engine EG is at a stop (the state of (3) of FIG. 2). In this state, the friction torque of the engine EG which is a negative torque functions as a reaction receiver for supporting the carrier 13. For this reason, the maximum rotation driving force which the first motor generator MG1 can output is limited to a rotation driving force at which a rotary torque transmitted to the input shaft 51 by the rotation driving force of the first motor generator MG1 becomes equal to or lower than the friction torque of the engine EG.

In a case where the required driving force is not obtained only by the rotation driving forces of the first motor generator MG1 and the second motor generator MG2, or in a case where the residual amount of the battery 33 is small, the vehicle travels in the split traveling mode.

In the split traveling mode, the control unit 40 controls the clutch actuator 50 so that the clutch 20 becomes the connected state, and controls the engine EG so that a predetermined rotation driving force is generated by the engine EG. As a result, the engine EG and the input shaft 51 are connected, and the rotation driving force of the engine EG is input to the carrier 13. Thereafter, the rotation driving force of the engine EG input to the carrier 13 is distributed and transmitted to the sun gear 11 and the ring gear 14. That is, the rotation driving force of the engine EG is distributed to the first motor generator MG1 and the driving wheels Wl and Wr.

In the split traveling mode, the engine EG is maintained in a state where the efficiency is high (a state where the efficiency of fuel consumption is high). In this state, since the rotation driving force of the engine EG is distributed and transmitted to the first motor generator MG1, as shown by an alternate long and short dash lines in FIG. 2, the first motor generator MG1 rotates normally ((4) of FIG. 2) and generates electric power. As a result, the first motor generator MG1 outputs a motor generator torque TMG1 of a reverse direction to the sun gear 11. That is, the first motor generator MG1 functions as a reaction receiver for supporting the reaction of an engine torque TE, so that the rotation driving force of the engine EG is distributed to the ring gear 14 and is transmitted to the driving wheels Wl and Wr. Then, the second motor generator MG2 is driven by a current generated by the first motor generator MG1 and a current supplied from the battery 33 and then drives the driving wheels Wl and Wr.

Incidentally, during traveling of the vehicle, in a case where the control unit 40 determines that the accelerator pedal 81 has been released (the accelerator position Ac is 0) or a case where the control unit 40 determines that the brake pedal 83 has been stepped on (the accelerator position Ac is larger than 0), the control unit 40 performs regenerative braking. In the regenerative braking, in principle, the control unit 40 controls the clutch actuator 50 so that the clutch 20 becomes the disconnected state. Thereafter, the control unit 40 outputs a control signal to the second inverter 32 so that the second motor generator MG2 generates a regenerative braking force and generates electric power. At this time, the second motor generator MG2 generates a rotary torque of a reverse direction. A current generated by the second motor generator MG2 charges the battery 33. Like this, since the regenerative braking is performed in a state where the clutch 20 is in the disconnected state, the kinetic energy of the vehicle is not wastefully consumed by the friction torque of the engine EG. Also, in a case where the battery 33 is full, the control unit 40 controls the clutch actuator 50 so that the clutch 20 becomes the disconnected state and thus rotates the engine EG, so that the friction torque of the engine EG (so-called engine brake) is used to decelerate the vehicle.

(Outline of this Disclosure)

In this disclosure, in a case of determining that there is a possibility of rust formation on the clutch 20, the control unit 40 operates the clutch actuator 50. As a result, the clutch 20 transitions from the connected state to the disconnected state, or the clutch 20 transitions from the disconnected state to the connected state. Therefore, it is possible to suppressing rusting of the clutch 20 due to continuous connection of the clutch 20. Hereinafter, the description thereof will be made in detail.

(First Rust-Suppressing Control of Clutch)

Subsequently, first rust-suppressing control of the clutch will be described with reference to the flow chart of FIG. 3. If the ignition is turned to ON-state so that the vehicle transitions from a state incapable of traveling to a state capable of traveling, the program proceeds to Step S201.

Figure 7:
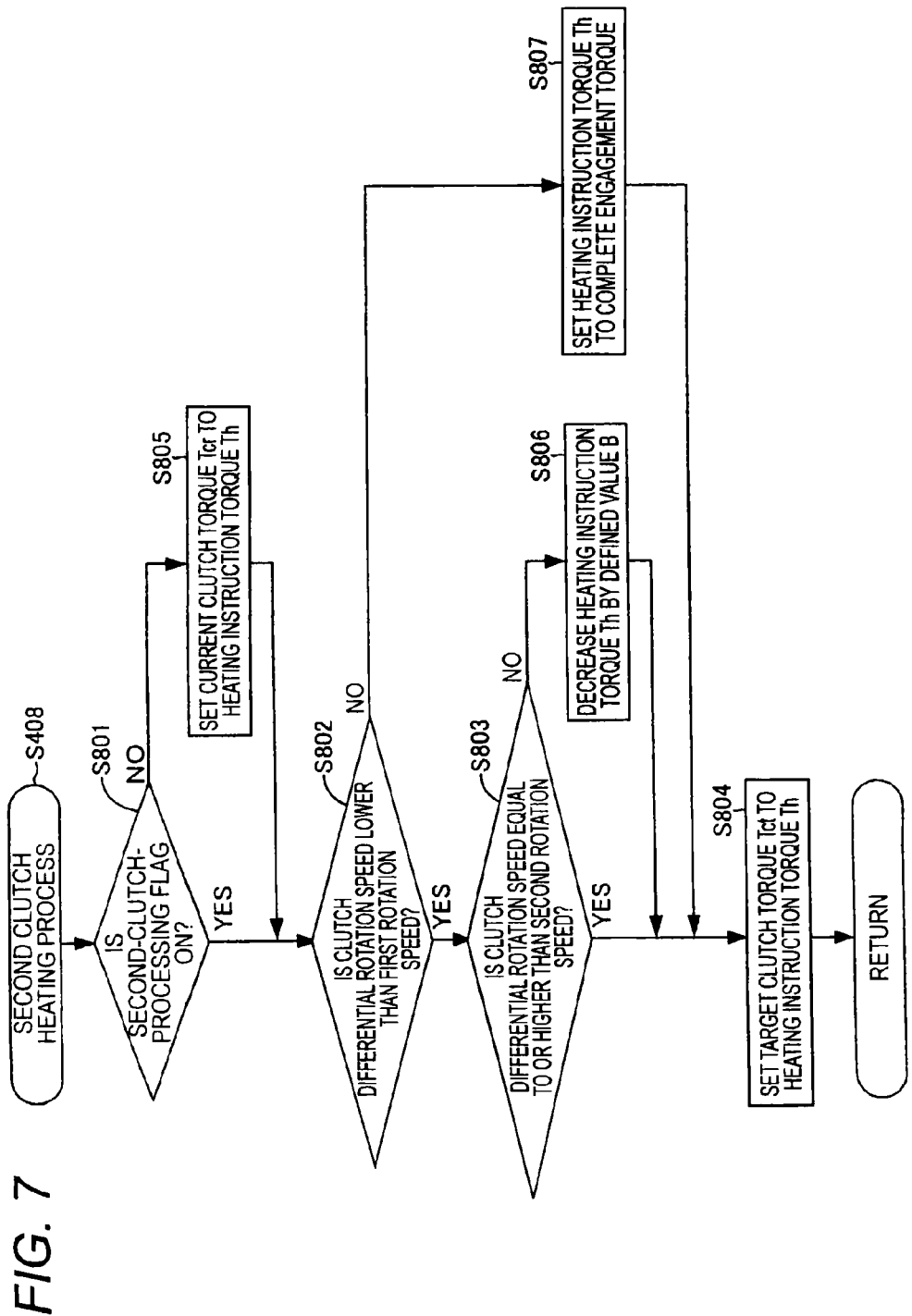
FIG. 7 is a flow chart illustrating a second clutch heating process which is another subroutine of the clutch temperature control.

In Step S201, the control unit 40 turns off a wetness flag, a under-drying flag, and a second-clutch-processing flag, and resets a timer to 0. If Step S201 finishes, the program proceeds to Step S202. The wetness flag represents that the clutch 20 is in a situation where the clutch 20 may be wet. Also, the under-drying flag represents that the clutch 20 is to be dried. The second-clutch-processing flag represents that a second clutch heating process shown in FIG. 7 is being performed.

In a case where the control unit 40 determines that the clutch 20 is in the disconnected state in Step S202 ("YES" in Step S202), the program proceeds to Step S203. In a case where the control unit 40 determines that the clutch 20 is in the connected state in Step S202 ("NO" in Step S202), the program proceeds to Step S205. Also, a case where the clutch 20 is in the disconnected state in a state where the ignition is ON-state means that the clutch 20 was disconnected when the previous ignition was off, in order to suppress sticking of the clutch 20 in Step S211.

In Step S203, the control unit 40 turns the wetness flag to ON-state, and then the program proceeds to Step S204.

In Step S204, the control unit 40 sets the target clutch torque Tct. The target clutch torque Tct is calculated according to the traveling state of the vehicle. That is, in a case where the clutch 20 transitions from the connected state to the disconnected state like in a case where the vehicle travels in the electric traveling mode, the target clutch torque Tct is set to 0. Also, in a case where the vehicle transitions from the electric traveling mode to the split traveling mode, in order to control the clutch 20 in the disconnected state to connect, the control unit 40 calculates the target clutch torque Tct to gradually increase from 0 as time goes on so as to become a complete engagement clutch torque. If Step S204 finishes, the program proceeds to Step S205.

In Step S205, the control unit 40 performs a clutch-state updating process. This clutch-state updating process will be described below with reference to a flow chart shown in FIG. 4. If the clutch-state updating process starts, the program proceeds to Step S301.

In a case where the control unit 40 determines that the wetness flag is ON-state in Step S301 ("YES" in Step S301), the program proceeds to Step S302. In a case where the control unit 40 determines that the wetness flag is OFF-state in Step S301 ("NO" in Step S301), the program proceeds to Step S305.

In a case where the control unit 40 determines that the clutch 20 is in a situation where the clutch 20 may not be wet in Step S302 ("YES" in Step S302), the program proceeds to Step S303. In a case where the control unit 40 determines that the clutch 20 is in a situation where the clutch 20 may be wet in Step S302 ("NO" in Step S302), the clutch-state updating process finishes, and the program proceeds to Step S206 of FIG. 3.

In a case of determining that the vehicle is traveling along a coast or on a dry river bed, based on the location information of the vehicle acquired by the information acquiring unit 90, the control unit 40 determines that the clutch 20 is in a situation where the clutch 20 may be wet. Also, in a case of determining that it is raining at the place where the vehicle is traveling, based on the weather information acquired by the information acquiring unit 90, the control unit 40 determines that the clutch 20 is in a situation where the clutch 20 may be wet. The situation where the clutch 20 may be wet means a situation where there is a possibility of the rust formation on the clutch 20.

The control unit 40 turns the wetness flag to OFF-state in Step S303, and turns the under-drying flag to ON-state in Step S304. If Step S304 finishes, the program proceeds to Step S320.

In a case where the control unit 40 determines that the clutch 20 is in a situation where the clutch 20 may be wet in Step S305 ("YES" in Step S305), the program proceeds to Step S306. In a case where the control unit 40 determines that the clutch 20 is not in a situation where the clutch 20 may be wet in Step S305 ("NO" in Step S305), the program proceeds to Step S308. Also, the determining method of Step S305 is the same as the above-described determining method of Step S302.

The control unit 40 turns the wetness flag to ON-state in Step S306, and turns the under-drying flag to OFF-state in Step S307. If Step S307 finishes, the program proceeds to Step S320.

In a case where the control unit 40 determines that the under-drying flag is ON-state in Step S308 ("YES" in Step S308), the program proceeds to Step S309. In a case where the control unit 40 determines that the under-drying flag is OFF-state in Step S308 ("NO" in Step S308), the program proceeds to Step S320.

In Step S309, the control unit 40 increases the value of the timer by an increment, and then the program proceeds to Step S310.

In a case where the control unit 40 determines that the value of the timer is larger than a drying time A in Step S310 ("YES" in Step S310), the program proceeds to Step S311. In a case where the control unit 40 determines that the value of the timer is equal to or smaller than the drying time A in Step S310 ("NO" in Step S310), the clutch-state updating process finishes, and the program proceeds to Step S206 of FIG. 3. The drying time A is calculated by referring to drying-time mapping data, representing a relation between the clutch temperature Tc and the drying time A and shown in FIG. 8, for the current temperature of the clutch 20. The clutch temperature Tc and the drying time A are inversely proportional to each other. That is, as the clutch temperature Tc increases, the drying time A decreases.

In Step S311, the control unit 40 turns the under-drying flag to OFF-state. If Step S311 finishes, the program proceeds to Step S320.

In a case where the control unit 40 determines that the under-drying flag is OFF-state in Step S320 ("YES" in Step S320), the program proceeds to Step S321. In a case where the control unit 40 determines that the under-drying flag is ON-state in Step S320 ("NO" in Step S320), the clutch-state updating process finishes, and the program proceeds to Step S206 of FIG. 3.

In Step S321, the control unit 40 resets the timer. If Step S321 finishes, the clutch-state updating process finishes, and the program proceeds to Step S206 of FIG. 3.

Referring to FIG. 3 again, a description will be made.

In a case where the control unit 40 determines that any one of the wetness flag and the under-drying flag is ON-state in Step S206 ("YES" in Step S206), the program proceeds to Step S207. In a case where the control unit 40 determines that both of the wetness flag and the under-drying flag are OFF-state in Step S206 ("NO" in Step S206), the program proceeds to Step S208.

In Step S208, the control unit 40 outputs a control signal to the clutch actuator 50, thereby controlling the clutch 20 so that the target clutch torque Tct is obtained. If Step S208 finishes, the program proceeds to Step S209.

In Step S207, the control unit 40 performs a clutch temperature control. The clutch temperature control will be described with reference to a flow chart shown in FIG. 5. If the clutch temperature control starts, the program proceeds to Step S401 of FIG. 5.

In Step S401, the control unit 40 calculates the clutch temperature Tc.

The clutch temperature Tc means the temperature of the friction member 22a. Specifically, based on the housing inside temperature Th detected by the temperature sensor 26, the integrated value of the heat generation amount of the friction member 22a, the integrated value of the heat radiation amount of the whole of the clutch 20 and the friction member 22a, and the like, the control unit 40 estimates the clutch temperature Tc which is the current temperature of the friction member 22a. Also, the heat generation amount of the friction member 22a is calculated based on the clutch differential rotation speed $\Delta\omega r$ which is the differential rotation speed of the clutch 20 in an engaged state (a difference between the engine rotation speed we and the input shaft rotation speed $\omega i$) and the clutch torque Tcr. If Step S401 finishes, the program proceeds to Step S402.

In a case where the control unit 40 determines that any one of the wetness flag and the under-drying flag is ON-state in Step S402 ("YES" in Step S402), the program proceeds to Step S403. In a case where the control unit 40 determines that both of the wetness flag and the under-drying flag are off in Step S402 ("NO" in Step S402), the program proceeds to Step S410.

In a case where the control unit 40 determines that the clutch temperature Tc is equal to or higher than a defined temperature T (for example, 120° C.) in Step S403 ("YES" in Step S403), the program proceeds to Step S410. In a case where the control unit 40 determines that the clutch temperature Tc is lower than the defined temperature T in Step S403 ("NO" in Step S403), the program proceeds to Step S404.

In a case where the control unit 40 determines that the vehicle is traveling in the electric traveling mode in Step S404 ("YES" in Step S404), the program proceeds to Step S405. In a case where the control unit 40 determines that the vehicle is traveling in the split traveling mode in Step S404 ("NO" in Step S404), the program proceeds to Step S407.

In a case where the control unit 40 determines that the clutch 20 is still in the disconnected state in Step S405 ("YES" in Step S405), the program proceeds to Step S406. In a case where the control unit 40 determines that the clutch 20 is in the engaged state in Step S405 ("NO" in Step S405), the program proceeds to Step S410. Although the vehicle is in the electric traveling mode, if the brake pedal 83 is stepped on when the battery 33 is full, a braking force according to the engine brake is generated in the engine EG, so that the clutch 20 is connected.

In Step S406, the control unit 40 performs a first clutch heating process. This first clutch heating process will be described with reference to a flow chart shown in FIG. 6. If the first clutch heating process starts, the program proceeds to Step S701 of FIG. 6.

In a case where the control unit 40 determines that the clutch differential rotation speed $\Delta\omega r$ is lower than a third rotation speed (for example, 2000 rpm) in Step S701 ("YES" in Step S701), the program proceeds to Step S702. In a case where the control unit 40 determines that the clutch differential rotation speed $\Delta\omega r$ is equal to or higher than the third rotation speed in Step S701 ("NO" in Step S701), the program proceeds to Step S704.

In a case where the control unit 40 determines that the clutch differential rotation speed $\Delta\omega r$ is equal to or higher than a fourth rotation speed (for example, 150 rpm) in Step S702 ("YES" in Step S702), the program proceeds to Step S703. In a case where the control unit 40 determines that the clutch differential rotation speed $\Delta\omega r$ is lower than the fourth rotation speed in Step S702 ("NO" in Step S702), the program proceeds to Step S704.

In Step S703, the control unit 40 sets the target clutch torque Tct. The target clutch torque Tct is a clutch torque by which the clutch 20 in the half-clutch state generates a target clutch heat generation amount. In the present embodiment, the target clutch torque Tct is set to a smaller one of a half of the friction torque of the engine EG and 5/100 of the maximum torque which is generated by the engine EG. If Step S703 finishes, the program proceeds to Step S410 of FIG. 5.

In Step S704, the control unit 40 sets the target clutch torque Tct to 0, that is, the control unit 40 sets the target clutch torque Tct so that the clutch 20 is disconnected. If Step S704 finishes, the first clutch heating process finishes, and then the program proceeds to Step S410 of FIG. 5.

Referring to FIG. 5 again, a description will be made.

In a case where the control unit 40 determines that the clutch 20 is still in the connected state in Step S407 ("YES" in Step S407), the program proceeds to Step S408. In a case where the control unit 40 determines that the clutch 20 in the disconnected state in Step S407 ("NO" in Step S407), the program proceeds to Step S410. Also, in a case where the second motor generator MG2 generates electric power to generate a regenerative braking force even in that the vehicle is traveling in the split traveling mode, the clutch 20 is disconnected in order to suppress occurrence of friction in the engine EG.

In Step S408, the control unit 40 performs a second clutch heating process. This second clutch heating process will be described with reference to a flow chart shown in FIG. 7. If the second clutch heating process starts, the program proceeds to Step S801 of FIG. 7.

In a case where the control unit 40 determines that the second-clutch-processing flag is ON-state in Step S801 ("YES" in Step S801), the program proceeds to Step S802. In a case where the control unit 40 determines that the second-clutch-processing flag is OFF-state in Step S801 ("NO" in Step S801), the program proceeds to Step S805.

In a case where the control unit 40 determines that the clutch differential rotation speed $\Delta\omega r$ is lower than a first rotation speed (for example, 350 rpm) in Step S802 ("YES" in Step S802), the program proceeds to Step S803. In a case where the control unit 40 determines that the clutch differential rotation speed Δωr is equal to or higher than the first rotation speed in Step S802 ("NO" in Step S802), the program proceeds to Step S807.

In a case where the control unit 40 determines that the clutch differential rotation speed Δωr is equal to or higher than a second rotation speed (for example, 150 rpm) in Step S803 ("YES" in Step S803), the program proceeds to Step S804. In a case where the control unit 40 determines that the clutch differential rotation speed Δωr is lower than the second rotation speed in Step S803 ("NO" in Step S803), the program proceeds to Step S806.

In Step S804, the control unit 40 sets the target clutch torque Tct to a heating instruction torque Th. In a case where Step S804 is performed for the first time (a second-clutch-heating-processing flag is OFF-state), the heating instruction torque Th is set to a current clutch torque Tcr in Step S805 (to be described below). If Step S804 finishes, the program proceeds to Step S409 of FIG. 5.

In Step S805, the control unit 40 sets the current clutch torque Tcr as the heating instruction torque Th. If Step S805 finishes, the program proceeds to Step S802.

In Step S806, the control unit 40 decreases the heating instruction torque Th by a defined value B and stores the decreased heating instruction torque Th. If Step S806 finishes, the program proceeds to Step S804.

In Step S807, the control unit 40 sets the heating instruction torque Th to a complete engagement torque which is the maximum torque that the clutch 20 can transmit, that is, the clutch torque Tcr of the clutch cover in the connected state. If Step S807 finishes, the program proceeds to Step S804.

Referring to FIG. 3 again, a description will be made.

In Step S409, the control unit 40 turns the second-clutch-heating-processing flag to ON-state. If Step S409 finishes, the program proceeds to Step S411.

In Step S410, the control unit 40 turns the second-clutch-heating-processing flag to OFF-state. If Step S410 finishes, the program proceeds to Step S411.

In Step S411, the control unit 40 calculates a clutch stroke by referring to a clutch torque map, shown in FIG. 10, for the target clutch torque Tct. Thereafter, the control unit 40 controls the clutch actuator 50 so that the calculated clutch stroke is obtained, thereby controlling the clutch torque Tcr to become the target clutch torque Tct.

At this time, in a state there is the clutch differential rotation speed Δωr so as to be the half-clutch state, the clutch 20 is engaged and the clutch disc 22, the flywheel 21, and the pressure plate 24 which are sliding members of the clutch 20 are rubbed against one another. Thus, these sliding members are heated so that water on the sliding members evaporates and is removed. Also, even if rust has been formed on the sliding members, since the sliding members are rubbed against one another, the rust is removed. If Step S411 finishes, the program proceeds to Step S209 of FIG. 3.

In a case where the control unit 40 determines that the ignition is OFF-state in Step S209 ("YES" in Step S209), the program proceeds to Step S210. In a case where the control unit 40 determines that the ignition is still ON-state in Step S209 ("NO" in Step S209), the program returns to Step S204.

In a case where the control unit 40 determines that any one of the wetness flag and the under-drying flag is ON-state in Step S210 ("YES" in Step S210), the program proceeds to Step S211. In a case where the control unit 40 determines that both of the wetness flag and the under-drying flag are off in Step S210 ("NO" in Step S210), the program proceeds to Step S212.

In Step S211, in a case where the clutch 20 is in the engaged state, the control unit 40 outputs a control signal to the clutch actuator 50, so that the clutch 20 is disconnected. If Step S211 finishes, the first rust-suppressing control of the clutch finishes, and the vehicle becomes the state incapable of traveling.

In Step S212, in a case where the clutch 20 is in the disconnected state, the control unit 40 outputs a control signal to the clutch actuator 50, so that the clutch 20 is connected. If Step S212 finishes, the first rust-suppressing control of the clutch finishes, and the vehicle becomes the state incapable of traveling.

(Second Rust-Suppressing Control of Clutch)

Subsequently, second rust-suppressing control of the clutch will be described with reference to the flow chart of FIG. 9. If the ignition is turned to ON-state so that the vehicle transitions from the state incapable of traveling to the state capable of traveling, the program proceeds to Step S501.

In Step S501, the control unit 40 turns a clutch operation history to OFF-sate and stores the clutch operation history in the storage unit. The clutch operation history is a history in which the clutch 20 has transitioned from the connected state to the disconnected state. If Step S501 finishes, the program proceeds to Step S502.

In Step S502, the control unit 40 reads the value of the counter from the storage unit. If Step S502 finishes, the program proceeds to Step S503.

In a case where the control unit 40 determines that the value of the counter is larger than a defined value C (for example, five) in Step S503 ("YES" in Step S503), the program proceeds to Step S504. In a case where the control unit 40 determines that the value of the counter is equal to or smaller than the defined value C in Step S503 ("NO" in Step S503), the program proceeds to Step S505.

In Step S504, the control unit 40 outputs a control signal to the clutch actuator 50, so that the clutch 20 is disconnected. Thereafter, the control unit 40 outputs a control signal to the first inverter 31, thereby rotating the first motor generator MG1 so that the clutch disc 22 which is an output-side member of the clutch 20 is rotated. As a result, the flywheel 21, the pressure plate 24, the clutch cover 23, and the clutch disc 22, which are input-side members of the clutch 20, rotate relatively, so that the phase of the clutch 20 changes. Next, the control unit 40 outputs a control signal to the clutch actuator 50, so that the clutch 20 is connected. If Step S504 finishes, the program proceeds to Step S505.

In a case where the control unit 40 determines that the vehicle is in the electric traveling mode in Step S505 ("YES" in Step S505), the program proceeds to Step S506. In a case where the control unit 40 determines that the vehicle is in the split traveling mode in Step S505 ("NO" in Step S505), the program proceeds to Step S513.

In a case where the control unit 40 determines that it is necessary to disconnect the clutch 20 in Step S513 ("YES" in Step S513), the program proceeds to Step S506. In a case where the control unit 40 determines that it is unnecessary to disconnect the clutch 20 in Step S513 ("NO" in Step S513), the program proceeds to Step S514. In the split traveling mode, a case where it is necessary to disconnect the clutch is a case where the second motor generator MG2 generates electric power, so that a regenerative braking force is generated.

In Step S506, the control unit 40 outputs a control signal to the clutch actuator 50, so that the clutch 20 is disconnected. If Step S506 finishes, the program proceeds to Step S507.

In Step S514, the control unit 40 outputs a control signal to the clutch actuator 50, so that the clutch 20 is connected. If Step S514 finishes, the program proceeds to Step S508.

In Step S507, the control unit 40 turns the clutch operation history to ON-state and stores the clutch operation history in the storage unit. If Step S507 finishes, the program proceeds to Step S508.

In a case where the control unit 40 determines that the ignition is OFF-state in Step S508 ("YES" in Step S508), the program proceeds to Step S509. In a case where the control unit 40 determines that the ignition has not OFF-state in Step S508 ("NO" in Step S508), the program proceeds to Step S505.

In a case where the control unit 40 determines that the clutch operation history is ON-state in Step S509 ("YES" in Step S509), the program proceeds to Step S510. In a case where the control unit 40 determines that the clutch operation history is OFF-state in Step S509 ("NO" in Step S509), the program proceeds to Step S512.

In Step S510, the control unit 40 resets the value of the counter to 0 and stores the value of the counter in the storage unit. If Step S510 finishes, the program proceeds to Step S511.

In Step S512, the control unit 40 increases the value of the counter by an increment of 1, and stores the value of the counter in the storage unit. If Step S512 finishes, the program proceeds to Step S511.

In Step S511, the control unit 40 outputs a control signal to the clutch actuator 50, so that the clutch 20 is connected. If Step S511 finishes, the second rust-suppressing control of the clutch finishes.

(Effects of Present Embodiment)

Figure 3:
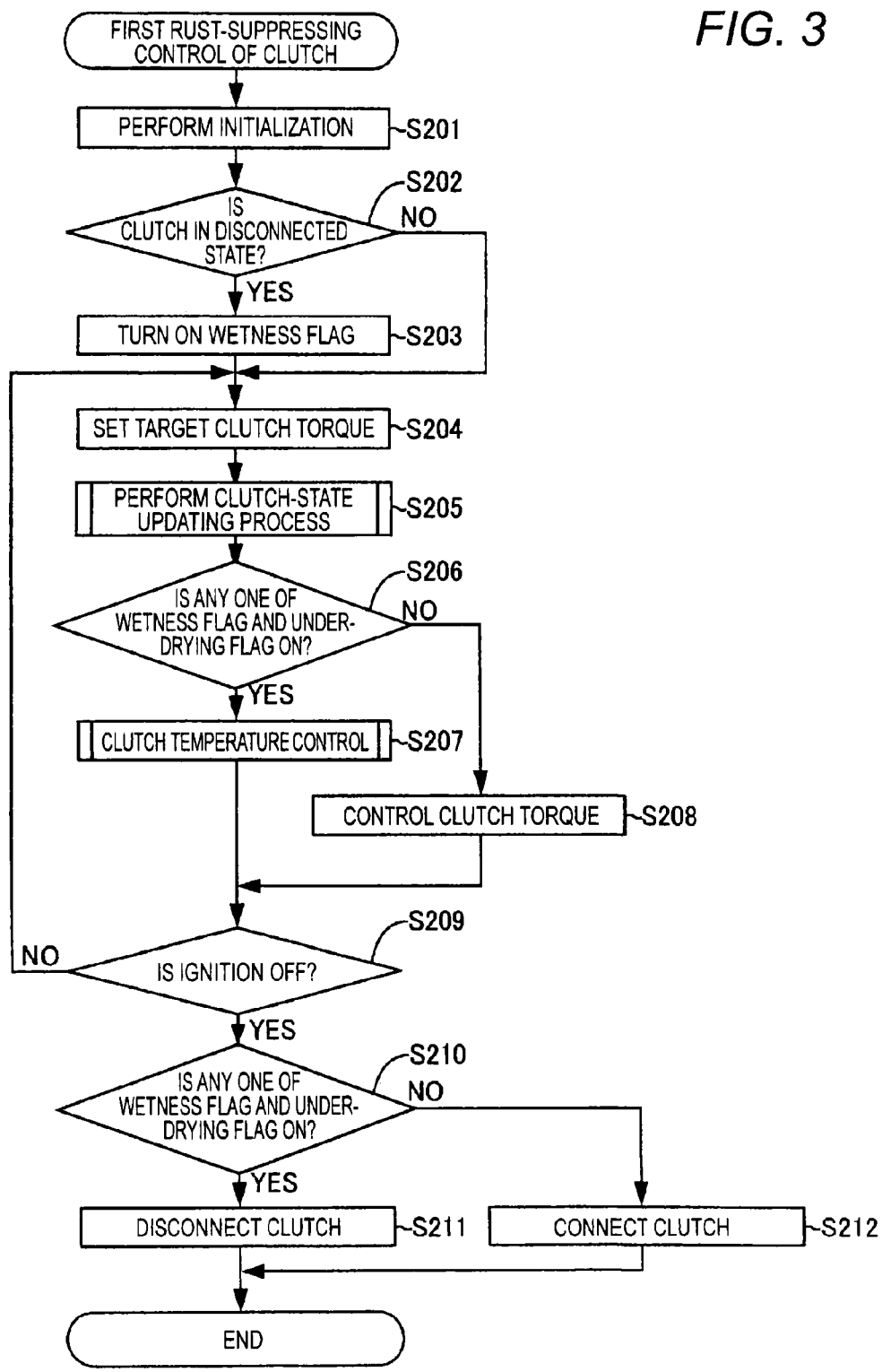
FIG. 3 is a flow chart illustrating a first rust-suppressing control of a clutch.
Figure 5:
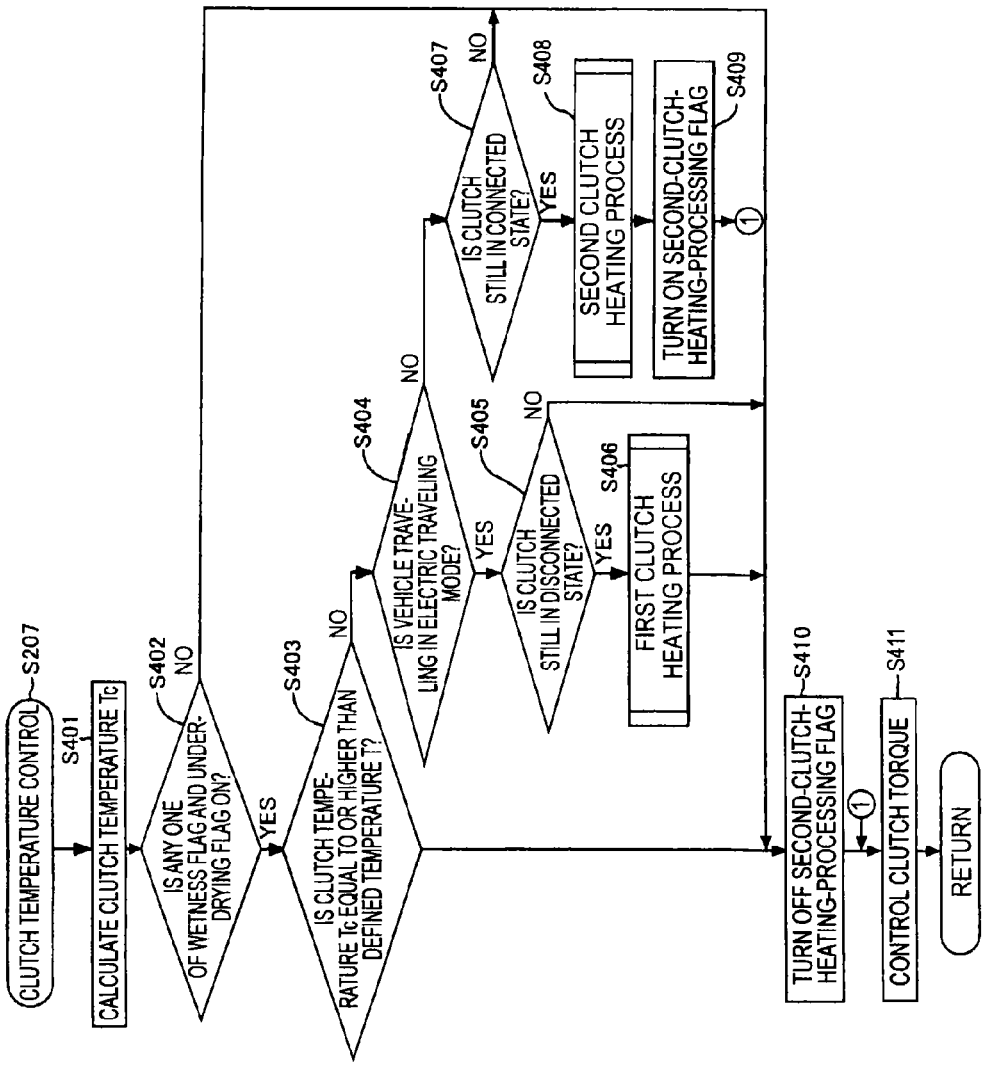
FIG. 5 is a flow chart illustrating a clutch temperature control which is another subroutine of the first rust-suppressing control of the clutch.
Figure 6:
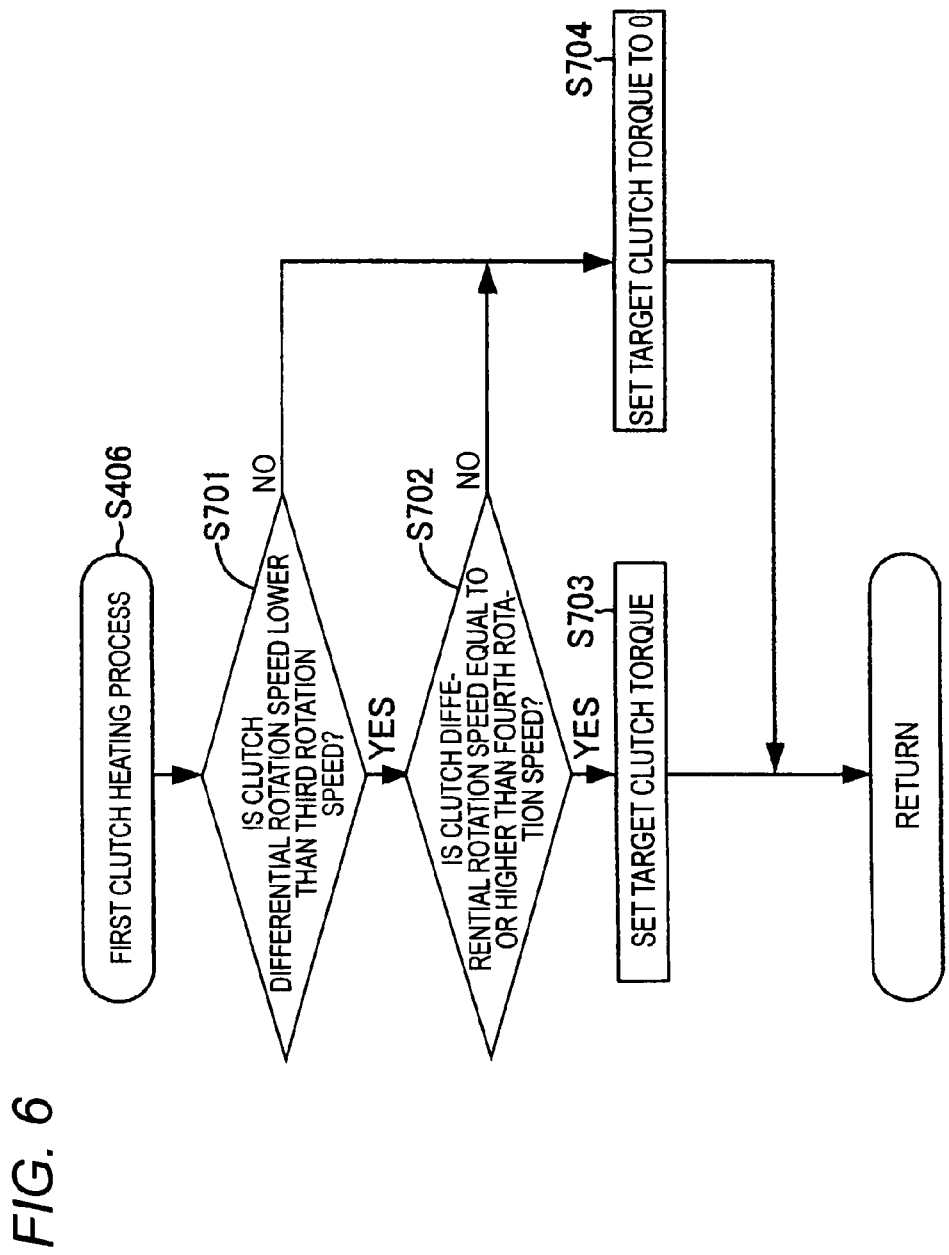
FIG. 6 is a flow chart illustrating a first clutch heating process which is a subroutine of the clutch temperature control.
Figure 9:
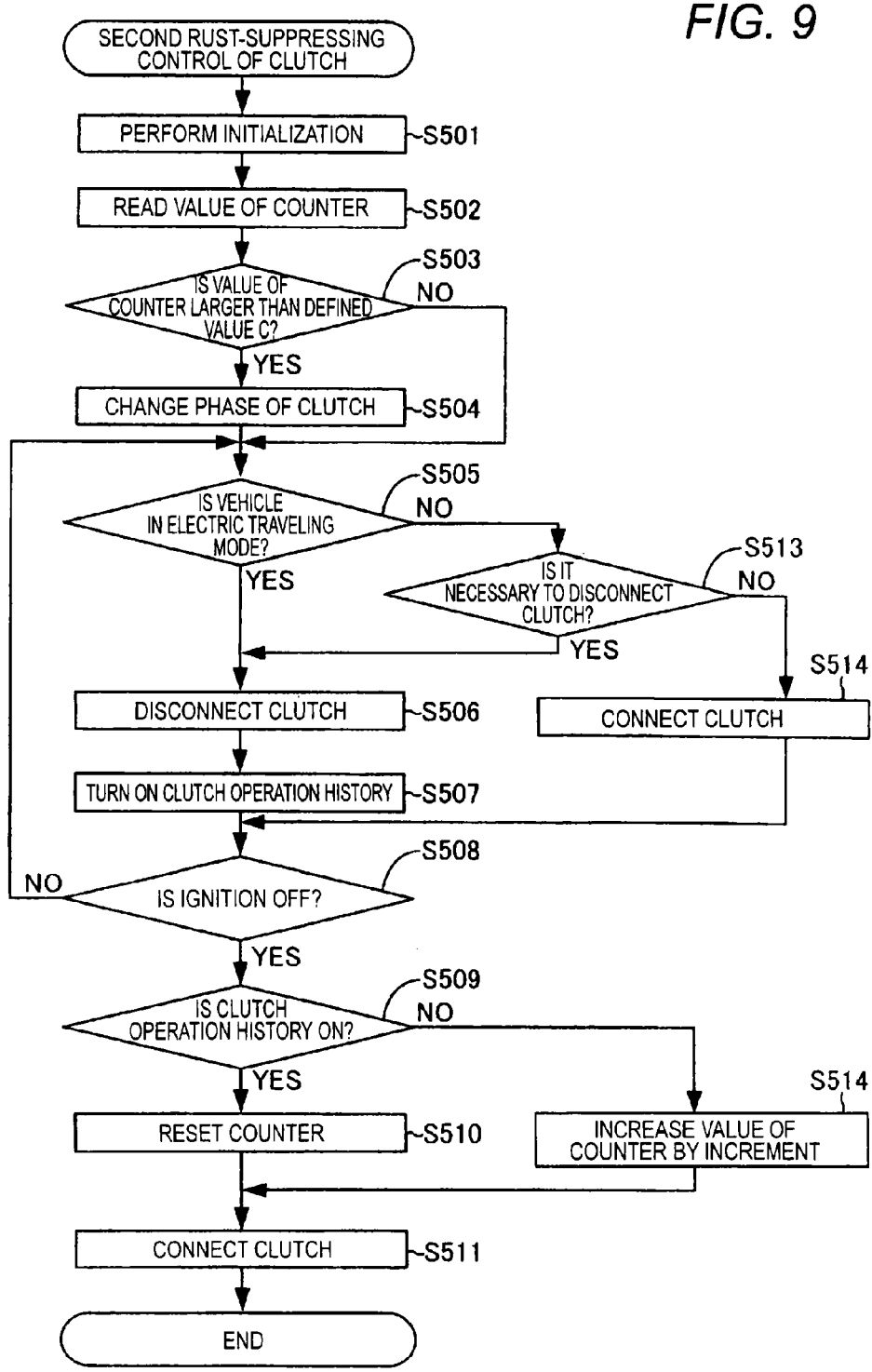
FIG. 9 is a flow chart illustrating a second rust-suppressing control of the clutch.

As apparent from the above description, in a case where the control unit 40 (the rust formation determining unit) determines that there is a possibility of the rust formation on the clutch 20 ("YES" in the determination of Step S206 of FIG. 3, "YES" in the determination of Step S210 of FIG. 3, or "YES" in the determination of Step S503 of FIG. 9), the control unit 40 (the rust formation suppressing unit) operates the clutch actuator 50 in Step S211 of FIG. 3, Step S411 of FIG. 5, or Step S504 of FIG. 9. As a result, the clutch 20 transitions from the connected state to the disconnected state, or the clutch 20 transitions from the disconnected state to the connected state. Therefore, it is possible to suppress rusting of the clutch 20 due to continuous connection of the clutch 20. Also, in a case where the clutch 20 is maintained in the disconnected state, the clutch 20 is connected, so that the rust formed on the clutch 20 is removed.

Also, in a case where the clutch 20 is in the connected state ("YES" in the determination of Step S407 of FIG. 5, or "YES" in the determination of Step S503 of FIG. 9), the control unit 40 (the rust formation suppressing unit) operates the clutch actuator 50 in Step S208 of FIG. 3 or Step S504 of FIG. 9, so that the clutch 20 is disconnected. Therefore, rusting of the clutch 20 due to continuous connection of the clutch 20 is suppressed by the operation of the clutch 20 in a disconnection direction.

Further, in a case where the clutch 20 is in the disconnected state ("YES" in the determination of Step S405 of FIG. 5), the control unit 40 (the rust formation suppressing unit) operates the clutch actuator 50 in Step S208 of FIG. 3, thereby operating the clutch 20 in a connection direction. Therefore, even if the clutch 20 is disconnected and the sliding surface of the clutch 20 comes into contact with air and rust is formed on the sliding surface of the clutch 20, since the clutch 20 is operated in the connection direction so that the sliding surface of the clutch 20 is rubbed, it is possible to remove the rust formed on the sliding surface of the clutch 20. For this reason, in a case where the disconnected clutch 20 is connected again, it is possible to suppress rusting of the clutch 20 due to the rust formed on the sliding surface of the clutch 20.

Furthermore, in a case where the clutch 20 has been maintained in the connected state, when the ignition is turned to ON-state and the vehicle transitions from the state incapable of traveling to the state capable of traveling ("YES" in the determination of Step S503 of FIG. 9), the control unit 40 (the rust formation suppressing unit) operates the clutch actuator 50 in Step S504 of FIG. 9, so that the clutch 20 is disconnected. Therefore, when the vehicle becomes the state capable of traveling, since the clutch is disconnected, it is possible to suppress rusting of the clutch due to continuous connection of the clutch.

Also, when the ignition is turned to OFF-state and the vehicle transitions from the state capable of traveling to the state incapable of traveling, if the control unit 40 (the rust formation determining unit) determines that there is a possibility of the rust formation on the clutch 20 ("YES" in the determination of Step S210 of FIG. 3), the control unit 40 (the rust formation suppressing unit) operates the clutch actuator 50 in Step S211, so that the clutch 20 is disconnected and the vehicle is to be the state incapable of traveling. Therefore, since the clutch 20 is in the disconnected state during a stop of the vehicle, it is possible to suppress the clutch 20 from becoming incapable of being disconnected due to rusting of the clutch 20 when the vehicle becomes the state capable of traveling again.

Figure 4:
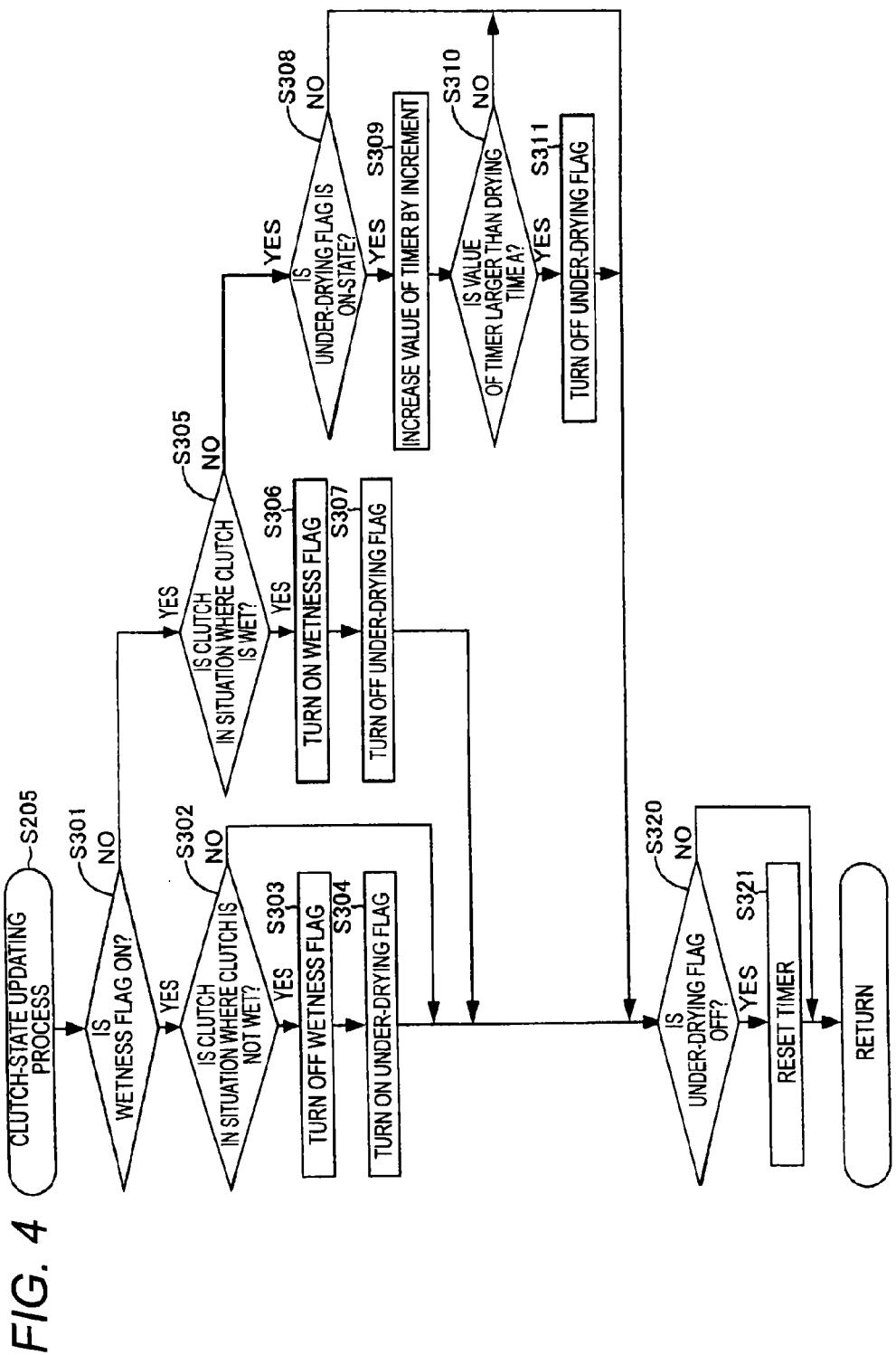
FIG. 4 is a flow chart illustrating a clutch-state updating process which is a subroutine of the first rust-suppressing control of the clutch.

Further, in Step S302 or S305 of FIG. 4, the control unit 40 (the rust formation determining unit) determines whether there is a possibility of the rust formation on the clutch 20, based on the rust information such as the location information and the weather information. That is, the control unit 40 determines whether the vehicle is traveling on road surface likely to be wet, such as a dry river bed or a coast, based on the location information of the vehicle, thereby determining whether there is a possibility of the rust formation on the clutch 20. Alternatively, the control unit 40 can determine whether the vehicle is traveling in a place where it is being raining, based on the weather information of the location of the vehicle, thereby determining a state where rust is likely to be formed on the clutch 20.

Therefore, it is possible to more reliably determine the possibility of rust formation on the clutch 20. For this reason, in a case where there is a possibility of the rust formation on the clutch 20, the control unit 40 (the rust formation suppressing unit) operates the clutch actuator 50, thereby removing water onto the clutch 20. In this way, it is possible to suppress the rust formation on the clutch 20 in advance.

Also, in Step S208 of FIG. 3, the control unit 40 (the rust formation suppressing unit) operates the clutch actuator 50 to put the clutch into 20 the half-clutch state. In this way, it is possible to heat the clutch 20. In a case where water is introduced to the clutch 20, it is possible to remove the water by drying. Therefore, it is possible to suppress the rust formation on the clutch 20 in advance. Also, even in a case where rust has been formed on a component of the clutch 20, the clutch 20 is put into the half-clutch state, so that the component of the clutch 20 is rubbed. Therefore, it is possible to remove the rust formed on the above-described component.

Also, in a case where the clutch differential rotation speed $\Delta\omega r$ is lower than the first rotation speed ("YES" in the determination of Step S802 of FIG. 7), in Step S208 of FIG. 3, the control unit 40 (the rust formation suppressing unit) operates the clutch actuator 50 so that the clutch torque Tcr becomes the target clutch torque Tct and then put the clutch 20 into the half-clutch state.

In this way, the clutch torque Tcr is controlled so as to be the target clutch torque Tct. Therefore, it is possible to reliably maintain the clutch 20 in the half-clutch state, and to reliably heat the clutch 20. For this reason, it is possible to reliably remove water onto the clutch 20 by drying, and even in a case where water is introduced to a component of the clutch 20, it is possible to reliably remove the water.

Also, in a case where the clutch differential rotation speed Δωr is equal to or higher than the first rotation speed ("YES" in the determination of Step S802 of FIG. 7), in Steps S807 and S804 of FIG. 7, the control unit sets the target clutch torque Tct to the complete engagement torque, and in Step S411 of FIG. 5, the control unit operates the clutch actuator 50, so that the clutch 20 is connected. Therefore, the clutch 20 is suppressed from becoming the half-clutch state in a state where the clutch differential rotation speed Δωr is excessively high. For this reason, overheating of the clutch 20 is suppressed, and it is possible to suppress a decrease in the life of the clutch 20, and deterioration in the characteristics of the clutch 20. Also, it is possible to suppress a feeling of deceleration according to a deficiency in transmitting the driving force from the engine EG and a decrease in the power generation amount of the first motor generator MG1, due to excessive increasing of the clutch differential rotation speed Δωr.

Also, in a case where the clutch differential rotation speed Δωr of the clutch 20 is lower than the first rotation speed, and is also lower than the second rotation speed lower than the first rotation speed ("NO" in the determination of Step S803 of FIG. 7), in Steps S806 and S804, the control unit 40 (the rust formation suppressing unit) reduces the target clutch torque Tct. As a result, in Step S411 of FIG. 5, the clutch differential rotation speed Δωr increases. Therefore, it is possible to reliably heat the clutch 20, and it is possible to reliably remove water onto the clutch 20 by drying.

Also, in a case where the clutch differential rotation speed Δωr is lower than the fourth rotation speed ("NO" in the determination of Step S702 of FIG. 6), the control unit 40 finishes the first clutch heating process, so that the clutch 20 stops the half-clutch state and transitions to the disconnected state. This is because if the clutch differential rotation speed Δωr is excessively low, i.e. lower than the fourth rotation speed, a variation in the friction coefficient of the clutch disc 22 with the flywheel 21 and the pressure plate 24 increases, and thus it becomes impossible to heat the clutch 20 as aimed and it is impossible to sufficiently heat the clutch 20.

In a case where the clutch differential rotation speed Δωr of the clutch 20 is equal to or higher than the third rotation speed ("NO" in the determination of Step S701 of FIG. 6), in Step S704, the control unit 40 (the rust formation suppressing unit) sets the target clutch torque Tct to 0, and in Step S208 of FIG. 3, the control unit operates the clutch actuator 50 to put the clutch 20 into the disconnected state. Therefore, the clutch 20 is suppressed from becoming the half-clutch state in a state where the clutch differential rotation speed Δωr is excessively high. Therefore, since the clutch differential rotation speed Δωr, a rapid rise in the temperature of the clutch 20 and overheating of the clutch 20 are suppressed from excessively increasing, it is possible to suppress a decrease in the life of the clutch 20 and deterioration in the characteristics of the clutch 20.

Also, in Step S504 of FIG. 9, after the control unit 40 (the rust formation suppressing unit) outputs control signals to the clutch actuator 50 and the first inverter 31 and the clutch 20 is disconnected, the phase of the clutch 20 is changed and then the clutch 20 is connected. In this way, it is possible to suppress sticking of the clutch 20 caused by connection of components of the clutch 20 at the same positions.

In a case where the clutch temperature Tc is equal to or higher than the defined temperature T ("YES" in the determination of Step S403 of FIG. 5), the control unit 40 (the rust formation suppressing unit) does not perform the first clutch heating process of Step S406 and the second clutch heating process of Step S408, and the clutch actuator 50 is operated. In this way, the clutch 20 is suppressed from becoming the half-clutch state in a state where the clutch temperature Tc is equal to or higher than the defined temperature T. Therefore, overheating of the clutch 20 is suppressed, and it is possible to suppress a decrease in the life of the clutch 20 and deterioration of the clutch 20.

(Other Embodiments)

In the above-described embodiment, when the ignition is turned to ON-state and the vehicle transitions to the state capable of traveling, both of the first rust-suppressing control of the clutch shown in FIG. 3 and the second rust-suppressing control of the clutch shown in FIG. 9 are performed. However, any one of the first rust-suppressing control of the clutch shown in FIG. 3 and the second rust-suppressing control of the clutch shown in FIG. 9 may be performed.

Also, in the above-described embodiment, in Step S310 of FIG. 4, based on the housing inside temperature Th detected by the temperature sensor 26, the heat generation amount of the friction member 22a, and the heat radiation amount of the whole of the clutch 20 and the friction member 22a, the control unit 40 acquires the clutch temperature Tc, which is the current temperature of the friction member 22a, by estimation. However, a temperature detection sensor such as a radiation thermometer for detecting the temperature of the friction member 22a may be provided in the vicinity of the friction member 22a, so as to acquire the clutch temperature Tc.

Also, in the above-described embodiment, the control unit 40 calculates the input shaft rotation speed ωi, which is the rotation speed of the input shaft 51, based on the rotation speed ωMG1r of the first motor generator MG1 input from the rotation speed sensor MG1-1, the rotation speed ωMG2r of the second motor generator MG2 (calculated from the vehicle speed V), and the gear ratio between the sun gear 11 and the inner gear 14a. However, an input shaft rotation speed detection sensor for detecting the rotation speed of the input shaft 51 may be provided in the vicinity of the input shaft 51, so as to directly detect the input shaft rotation speed ωi.

In the above-described embodiment, input-side members of the clutch 20 which are connected to the output shaft EG-1 are the flywheel 21, the pressure plate 24, and the clutch cover 23, and an output-side member of the clutch 20 which is connected to the input shaft 51 is the clutch disc 22. However, an input-side member of the clutch 20 may be the clutch disc 22, and output-side members of the clutch 20 may be the flywheel 21 and the clutch cover 23.

In the above-described embodiment, the clutch 20 is a normally closed clutch. However, it goes without saying that the technical idea of this disclosure can also be applied to a normally open clutch so that the clutch 20 becomes the disconnected state when the ignition is turned to OFF-state. In this embodiment, if the clutch 20 is connected in Step S514 of the second rust-suppressing control of the clutch shown in FIG. 5, the program proceeds to Step S507 in which the clutch operation history is turned on. Meanwhile, if Step S506 finishes, the program proceeds to Step S508.

In this embodiment, when the clutch 20 is in the disconnected state for a long time, the clutch 20 is connected in Step S504 and then is disconnected. At this time, the clutch disc 22, the flywheel 21, and the pressure plate 24 which are sliding members of the clutch 20 are rubbed against one another, so that the rust formed thereon is removed.

In the above-described embodiment, the clutch 20 is a dry-type single-plate clutch. However, it goes without saying that the technical idea of this disclosure can also be applied to a hybrid driving apparatus 100 including a dry-type multi-plate clutch having a plurality of clutch discs 22.

In the second rust-suppressing control of the clutch shown in FIG. 9, in a case where the value of the counter is larger than the defined value C ("YES" in the determination of Step S503), in Step S504, the control unit disconnects and connects the clutch 20, thereby suppressing sticking of the clutch 20. However, in Step S503, the control unit 40 may acquire date and time from the information acquiring unit 90 or the like. In a case where a defined time is elapsed from the previous operation date and time of the clutch 20 in Step S503, the control unit 40 may operate the clutch 20 in Step S504, thereby suppressing sticking of the clutch 20.

In the above-described embodiment, in Step S504 of FIG. 9, the control unit 40 rotates the first motor generator MG1, thereby changing the phase of the clutch 20. However, the control unit 40 may rotate the engine EG, thereby changing the phase of the clutch 20.

Alternatively, in Step S504 of FIG. 9, the control unit 40 may output a control signal to the clutch actuator 50, thereby repeating disconnecting and connecting of the clutch 20 a predetermined number of times so as to suppress sticking of the clutch 20. In this embodiment, the first motor generator MG1 and the engine EG may not be rotated.

In the above-described embodiment, the clutch actuator 50 is an electric clutch actuator configured so that the clutch torque Tcr is controlled by the clutch stroke. However, the clutch actuator 50 may be a clutch actuator configured so that the clutch torque Tcr is controlled by a hydraulic pressure, an air pressure, a voltage, a current, a load, or a pressure.

In the above-described embodiment, in Step S302 or S305 of FIG. 4, the control unit 40 (the rust formation determining unit) determines a situation where the clutch 20 may be wet, that is, whether there is a possibility of the rust formation on the clutch 20, based on the location information acquired by the location information acquiring unit 90a or the weather information acquired by the weather information acquiring unit 90b. However, the control unit may determine whether there is a possibility of the rust formation on the clutch 20, based on rust information such as the humidity or temperature of ambient air of the vehicle traveling. In this embodiment, the information acquiring unit 90 for acquiring the rust information is a temperature sensor, a humidity sensor, or the like. Alternatively, the control unit may determine whether there is a possibility of the rust formation on the clutch 20, based on a detection signal from a raindrop sensor attached to the vehicle.

(Hybrid Driving Apparatus of Second Embodiment)

Figure 11:
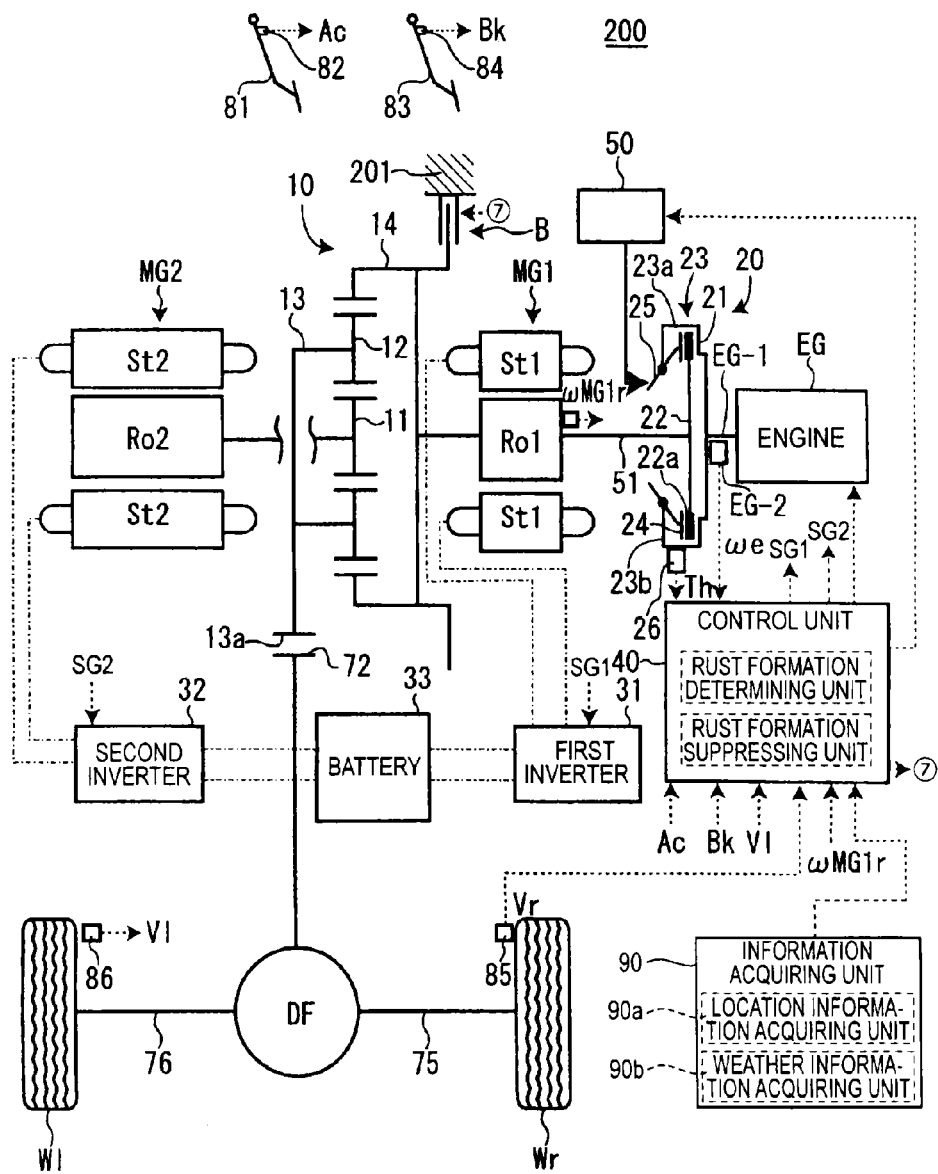
FIG. 11 is an explanatory view illustrating the configuration of a hybrid driving apparatus of a second embodiment.

Hereinafter, with respect to a hybrid driving apparatus 200 of a second embodiment, differences from the hybrid driving apparatus 100 of the first embodiment will be described with reference to FIG. 11. Components having the same structures as those of the hybrid driving apparatus 100 of the first embodiment are denoted by the same reference symbols as those of the hybrid driving apparatus 100 of the first embodiment, and detailed descriptions will be omitted.

In the hybrid driving apparatus 200 of the second embodiment, the first rotor Ro1 of the first motor generator MG1 is connected to the input shaft 51 and is also connected to the ring gear 14 of the planetary gear mechanism 10. Further, the second rotor Ro2 of the second motor generator MG2 is connected to the sun gear 11 of the planetary gear mechanism 10. An output gear 13a is formed on the carrier 13. The output gear 13a and the input gear 72 are engaged with each other.

The ring gear 14 is configured to be rotatable or fixed with respect to a housing 201 by a brake B. The brake B is configured to be controlled by the control unit 40.

In the electric traveling mode, the control unit 40 controls the clutch actuator 50 so that the clutch 20 becomes the disconnected state, and the control unit 40 controls the brake B so that the ring gear 14 is fixed to the housing 201. Thereafter, the control unit 40 outputs a control signal to the second inverter 32, thereby driving the second motor generator MG2 so that the required driving force is obtained.

Also, in a case where the required driving force is not obtained only by the rotation driving force of the second motor generator MG2, the control unit 40 controls the clutch actuator 50 so that the clutch 20 becomes the disconnected state, and the control unit 40 controls the brake B so that the ring gear 14 becomes rotatable with respect to the housing 201. Thereafter, the control unit 40 outputs control signals to the first inverter 31 and the second inverter 32, thereby driving the first motor generator MG1 and the second motor generator MG2 so that the required driving force is obtained.

In the split traveling mode, the control unit 40 controls the clutch actuator 50 so that the clutch 20 becomes the engaged state, and the control unit 40 controls the brake B so that the ring gear 14 becomes rotatable with respect to the housing 201. Thereafter, the control unit 40 outputs a control signal to the second inverter 32, thereby driving the second motor generator MG2, and the control unit 40 controls the engine EG so that the engine EG generates a predetermined rotation driving force.

As a result, the engine EG and the input shaft 51 are connected, and the rotation driving force of the engine EG is input to the first motor generator MG1 and to the ring gear 14. The first motor generator MG1 generates electric power by the rotation driving force of the engine EG. Thereafter, the rotation driving force of the engine EG and the rotation driving force of the second motor generator MG2 input to the ring gear 14 are transmitted to the driving wheels Wr and Wl.

(Hybrid Driving Apparatus of Third Embodiment)

Figure 12:
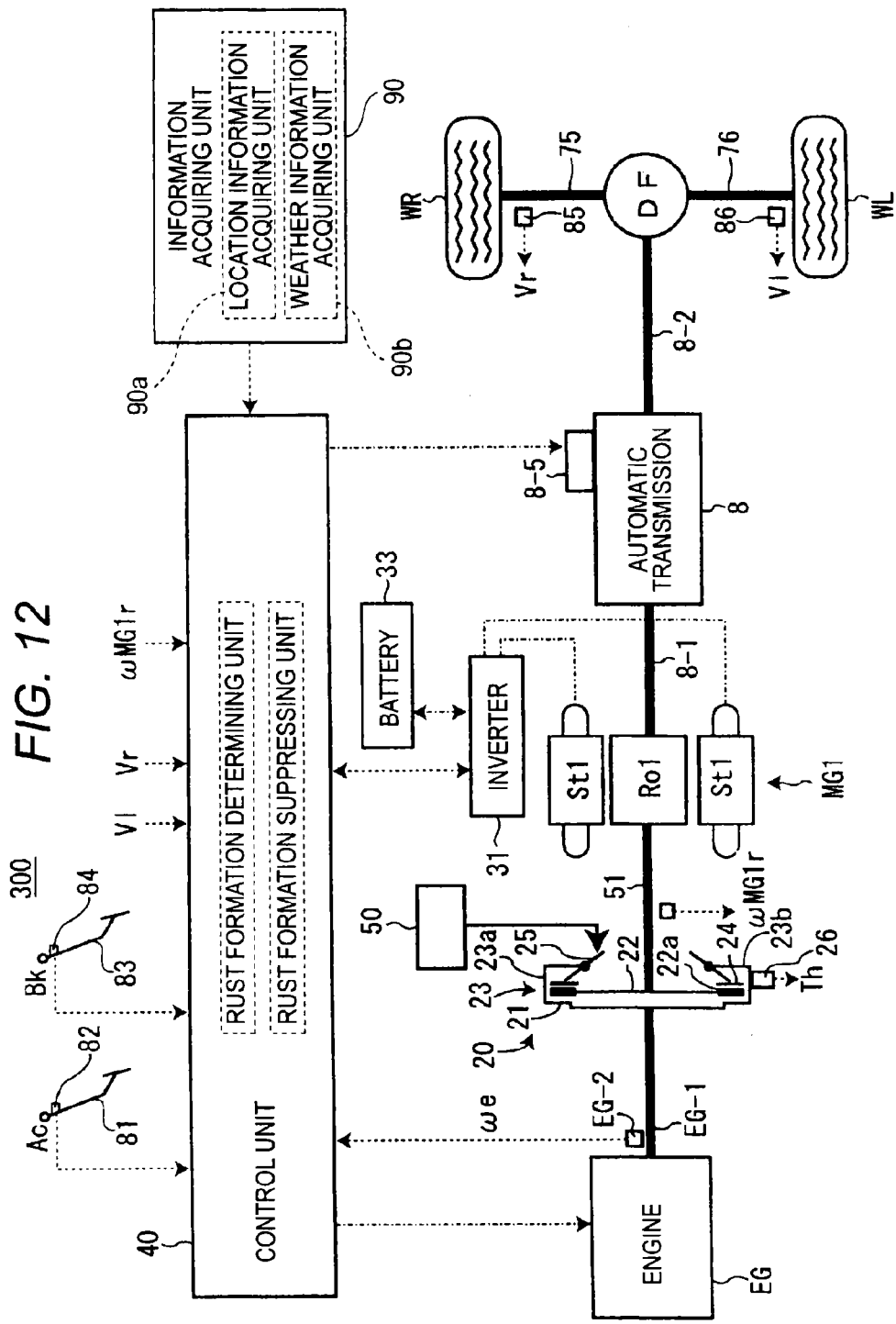
FIG. 12 is an explanatory view illustrating the configuration of a hybrid driving apparatus of a third embodiment.

Hereinafter, with respect to a hybrid driving apparatus 300 of a third embodiment, differences from the hybrid driving apparatus 100 of the first embodiment will be described with reference to FIG. 12. Components having the same structures as those of the hybrid driving apparatus 100 of the first embodiment are denoted by the same reference symbols as those of the hybrid driving apparatus 100 of the first embodiment, and detailed descriptions will be omitted.

The hybrid driving apparatus 300 of the third embodiment has an automatic transmission 8, instead of the second motor generator MG2 and the planetary gear mechanism 10.

The first rotor Ro1 of the first motor generator MG1 is connected to the input shaft 51. Between the first motor generator MG1 and the differential mechanism DF, the automatic transmission 8 is installed. That is, the first rotor Ro1 is connected to the transmission input shaft 8-1 of the automatic transmission 8, and the transmission output shaft 8-2 of the automatic transmission 8 is connected to the differential mechanism DF.

The automatic transmission 8 is a transmission having a gearshift mechanism for varying a transmission gear ratio which is obtained by dividing the rotation speed of the transmission input shaft 8-1 by the rotation speed of the transmission output shaft 8-2. Examples of the automatic transmission 8 include an automatic transmission having a torque converter or a planetary gear mechanism, an automatic/manual transmission, a dual-clutch transmission, and a non-stage transmission (CVT). The gearshift mechanism operates by a transmission actuator 8-5. The transmission actuator 8-5 operates the gearshift mechanism based on a gearshift command output from the control unit 40.

(Hybrid Driving Apparatus of Fourth Embodiment)

Figure 13:
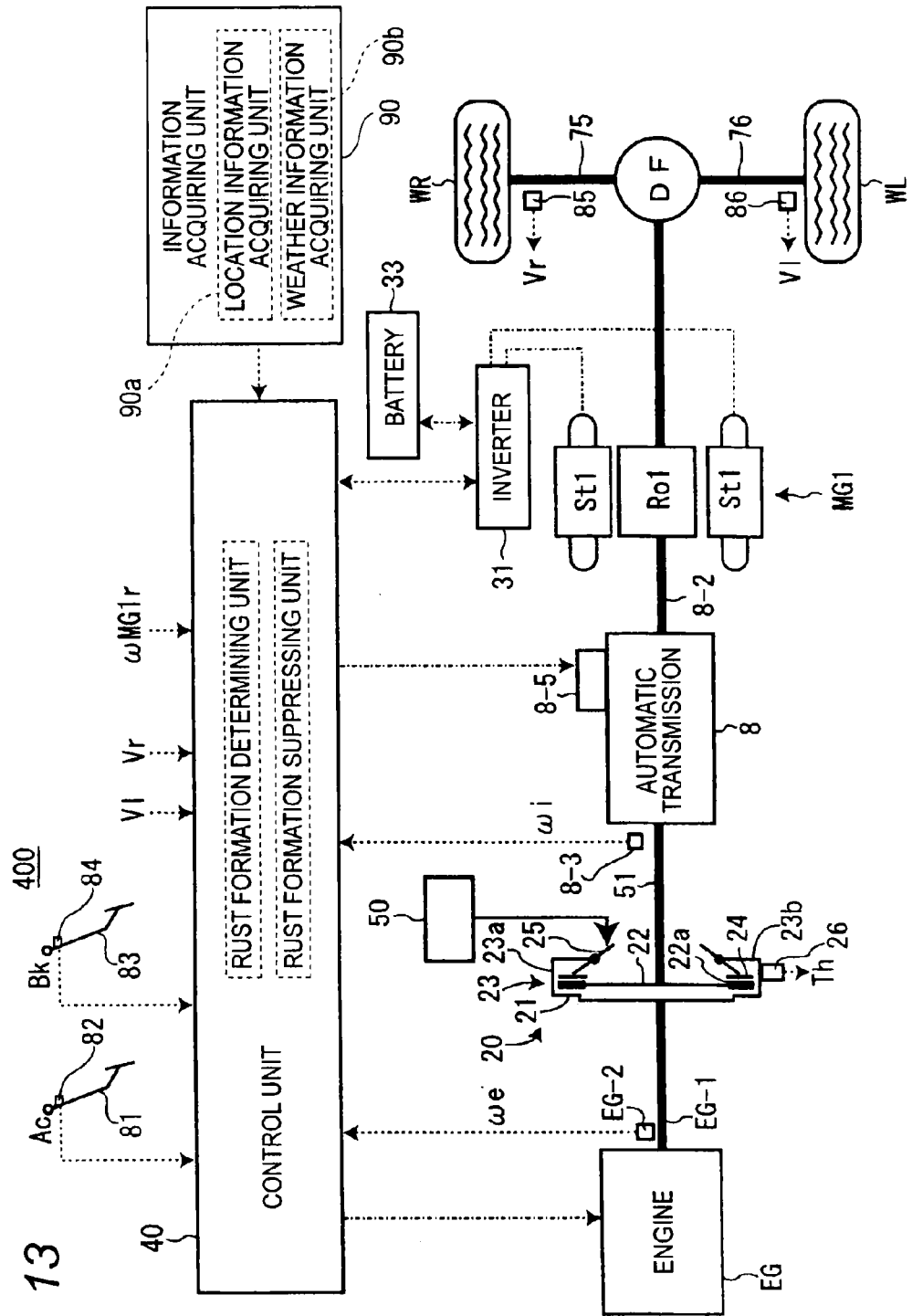
FIG. 13 is an explanatory view illustrating the configuration of a hybrid driving apparatus of a fourth embodiment.

Hereinafter, with respect to a hybrid driving apparatus 400 of a fourth embodiment, differences from the hybrid driving apparatus 300 of the third embodiment will be described with reference to FIG. 13. Components having the same structures as those of the hybrid driving apparatus 300 of the third embodiment are denoted by the same reference symbols as those of the hybrid driving apparatus 300 of the third embodiment, and detailed descriptions will be omitted.

In the hybrid driving apparatus 400 of the fourth embodiment, the first motor generator MG1 is installed between the automatic transmission 8 and the differential mechanism DF. That is, the input shaft 51 is the input shaft of the automatic transmission 8, and the transmission output shaft 8-2 is connected to the first rotor Ro1, and the first rotor Ro1 is connected to the differential mechanism DF.

In the vicinity of the input shaft 51, an input shaft rotation speed sensor 8-3 for detecting the input shaft rotation speed $\omega i$ and outputting a detection signal to the control unit 40 is provided.

What is claimed is:

1. A hybrid driving apparatus comprising:
   an engine configured to output a rotation driving force to an output shaft;
   an input shaft configured to rotate in association with rotation of driving wheels of a vehicle;
   a clutch that is provided between the output shaft and the input shaft to disengageably connect the output shaft and the input shaft;
   a clutch actuator configured to operate the clutch;
   a motor generator configured to rotate in association with rotation of the input shaft;
   a rust formation determining unit configured to determine whether there is a possibility of a rust formation on the clutch; and
   a rust formation suppressing unit configured to operate the clutch actuator in a case where the rust formation determining unit determines that there is the possibility of the rust formation on the clutch,
   wherein in a case where the clutch is in a connected state, the rust formation suppressing unit operates the clutch actuator to operate the clutch in a disconnection direction.

2. The hybrid driving apparatus according to claim 1,
   wherein in a case where the clutch is in a disconnected state, the rust formation suppressing unit operates the clutch actuator to operate the clutch in a connection direction.

3. The hybrid driving apparatus according to claim 2,
   wherein the rust formation suppressing unit operates the clutch actuator to put the clutch into a half-clutch state.

4. The hybrid driving apparatus according to claim 3,
   wherein in a case where the clutch differential rotation speed of the clutch is equal to or higher than a third rotation speed, the rust formation suppressing unit operates the clutch actuator to put the clutch into the disconnected state.

5. The hybrid driving apparatus according to claim 3,
   wherein in a case where the clutch differential rotation speed of the clutch is lower than a fourth rotation speed, the rust formation suppressing unit operates the clutch actuator to put the clutch into the disconnected state.

6. The hybrid driving apparatus according to claim 1, further comprising:
   a rust information acquiring unit that acquires rust information relating to the rust formation on the clutch,
   wherein based on the rust information, the rust formation determining unit determines whether there is a possibility of the rust formation on the clutch.

7. The hybrid driving apparatus according to claim 6,
   wherein the rust information acquiring unit acquires the rust information from an outside of the vehicle.

8. The hybrid driving apparatus according to claim 1,
   wherein the rust formation suppressing unit operates the clutch actuator to put the clutch into a half-clutch state.

9. The hybrid driving apparatus according to claim 8,
   wherein in a case where a clutch differential rotation speed is lower than a first rotation speed, the rust formation suppressing unit operates the clutch actuator so that the clutch torque of the clutch becomes a target clutch torque to put the clutch into the half-clutch state, and
   wherein in a case where the clutch differential rotation speed is equal to or higher than the first rotation speed, the rust formation suppressing unit operates the clutch actuator to put the clutch into the connected state.

10. The hybrid driving apparatus according to claim 9,
    wherein in a case where the clutch differential rotation speed of the clutch is lower than the first rotation speed and is also lower than a second rotation speed lower than the first rotation speed, the rust formation suppressing unit decreases the target clutch torque.

11. The hybrid driving apparatus according to claim 1, further comprising:
    a clutch temperature acquiring unit configured to acquire a current temperature of the clutch,
    wherein in a case where the temperature of the clutch is equal to or higher than a defined temperature, the rust formation suppressing unit does not operate the clutch actuator.

12. A hybrid driving apparatus comprising:
    an engine configured to output a rotation driving force to an output shaft;
    an input shaft configured to rotate in association with rotation of driving wheels of a vehicle;
    a clutch that is provided between the out shaft and the input shaft to disengageably connect the output shaft and the input shaft;
    a clutch actuator configured to operate the clutch;
    a motor generator configured to rotate in association with rotation of the input shaft;
    a rust formation determining unit configured to determine whether there is a possibility of a rust formation on the clutch; and
    a rust formation suppressing unit configured to operate the clutch actuator in a case where the rust formation determining unit determines that there is the possibility of the rust formation on the clutch,
    wherein when the vehicle transitions from a state incapable of traveling to a state capable of traveling, in a case where the rust formation determining unit determines that the clutch is maintained in the connected state and there is the possibility of the rust formation on the clutch, the rust formation suppressing unit operates the clutch actuator to put the clutch into the disconnected state.

13. The hybrid driving apparatus according to claim 12,
    wherein the rust formation suppressing unit changes a phase of the clutch after disconnecting the clutch, and then the rust formation suppressing unit controls the clutch to be connected.

14. A hybrid driving apparatus comprising:
an engine configured to output a rotation driving force to an output shaft;
an input shaft configured to rotate in association with rotation of driving wheels of a vehicle;
a clutch that is provided between the output shaft and the input shaft to disengageably connect the output shaft and the input shaft;
a clutch actuator configured to operate the clutch;
a motor generator configured to rotate in association with rotation of the input shaft;
a rust formation determining unit configured to determine whether there is a possibility of a rust formation on the clutch; and
a rust formation suppressing unit configured to operate the clutch actuator in a case where the rust formation determining unit determines that there is the possibility of the rust formation on the clutch,
wherein when the vehicle transitions from the state capable of traveling to the state incapable of traveling, in a case where the rust formation determining unit determines that there is a possibility of the rust formation on the clutch, the rust formation suppressing unit operates the clutch actuator to put the clutch into the disconnected state and then puts the vehicle into the state incapable of traveling.

* * * * *